United States Patent
Takemoto et al.

(10) Patent No.: US 7,496,294 B2
(45) Date of Patent: Feb. 24, 2009

(54) OPTICAL MULTI-BRANCH COMMUNICATION SYSTEM

(75) Inventors: Michiya Takemoto, Tokyo (JP); Toshikazu Yoshida, Tokyo (JP); Hiroaki Mukai, Tokyo (JP); Yoshihiro Asashiba, Tokyo (JP); Hiroshi Ichibangase, Tokyo (JP); Seiji Kozaki, Tokyo (JP); Mitsuyoshi Iwasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 682 days.

(21) Appl. No.: 10/182,396

(22) PCT Filed: Aug. 30, 2001

(86) PCT No.: PCT/JP01/07493

§ 371 (c)(1),
(2), (4) Date: Jul. 30, 2002

(87) PCT Pub. No.: WO02/49290

PCT Pub. Date: Jun. 20, 2002

(65) Prior Publication Data

US 2003/0002114 A1    Jan. 2, 2003

(30) Foreign Application Priority Data

Dec. 15, 2000    (JP)   ............................. 2000-382627

(51) Int. Cl.
*H04B 10/00*    (2006.01)

(52) U.S. Cl. ......................................................... 398/5
(58) Field of Classification Search ................. 398/1–8, 398/168, 12, 17, 63, 33, 167.5
See application file for complete search history.

(56) References Cited

U.S. PATENT DOCUMENTS

| | | | |
|---|---|---|---|
| 5,623,482 A * | 4/1997 | Okanoue | ..................... 370/224 |
| 6,052,210 A * | 4/2000 | Nathan | ......................... 398/56 |
| 6,430,150 B1 * | 8/2002 | Azuma et al. | ................ 370/218 |
| 2002/0071149 A1 * | 6/2002 | Xu et al. | ...................... 359/110 |

FOREIGN PATENT DOCUMENTS

| | | |
|---|---|---|
| EP | 0 644 704 A2 | 3/1995 |
| EP | 1 041 852 A2 | 10/2000 |
| EP | 1 179 965 A2 | 2/2002 |
| EP | 1 185 129 A2 | 3/2002 |
| JP | 11-122172 | 4/1999 |
| JP | 2000-349799 | 12/2000 |

* cited by examiner

*Primary Examiner*—Quan-Zhen Wang
(74) *Attorney, Agent, or Firm*—Oblon, Spivak, McClelland, Maier & Neustadt, P.C.

(57) ABSTRACT

A primary station equipment unit transmits, to a secondary station equipment unit, a message transmission enable signal granting transmission of a PST message from the secondary station equipment unit, when a predetermined period of time defined for transmission elapses after the primary station equipment unit transmitted a downstream PST message in a redundancy switching process corresponding to the secondary station equipment unit.

3 Claims, 18 Drawing Sheets

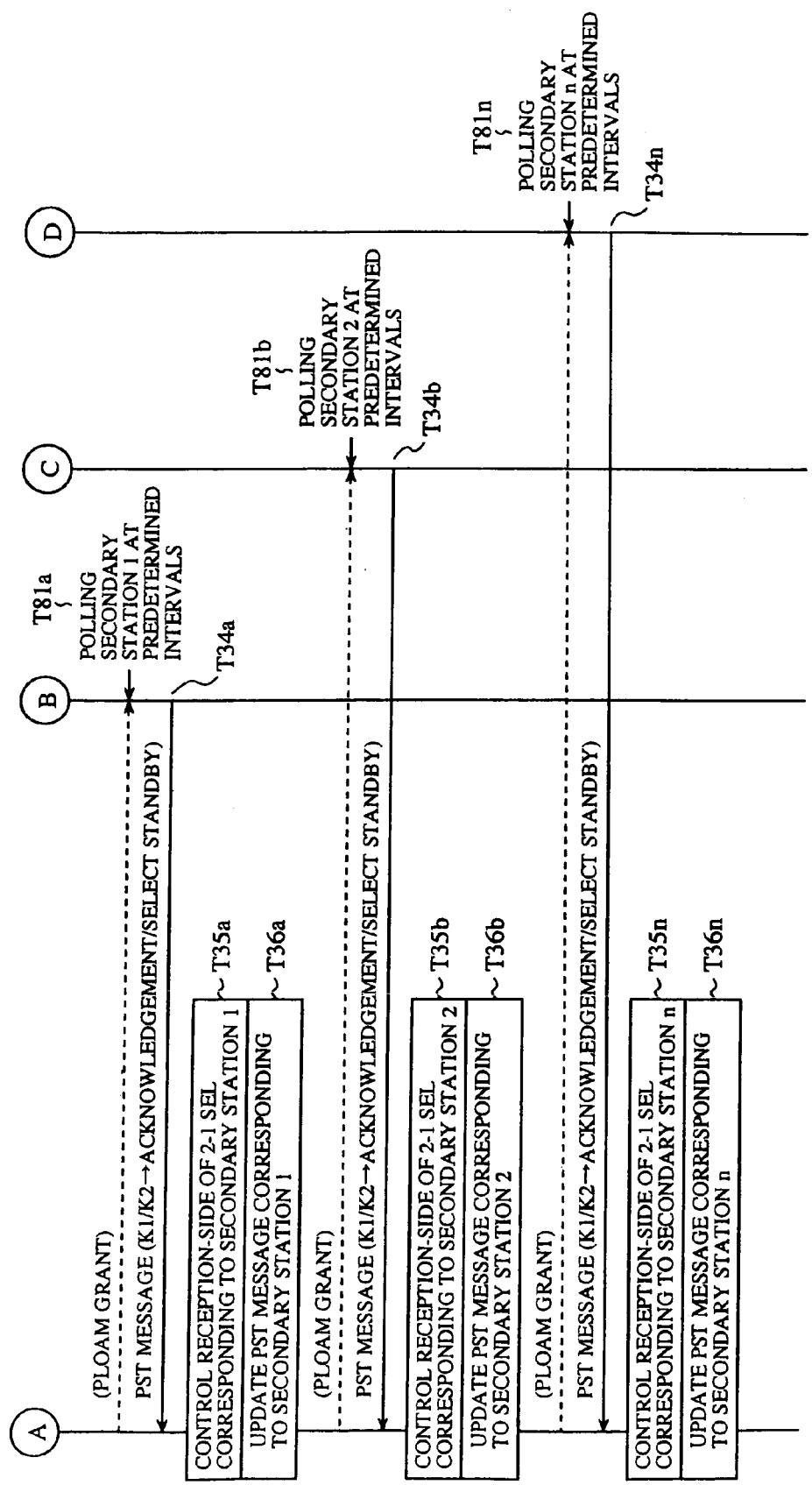

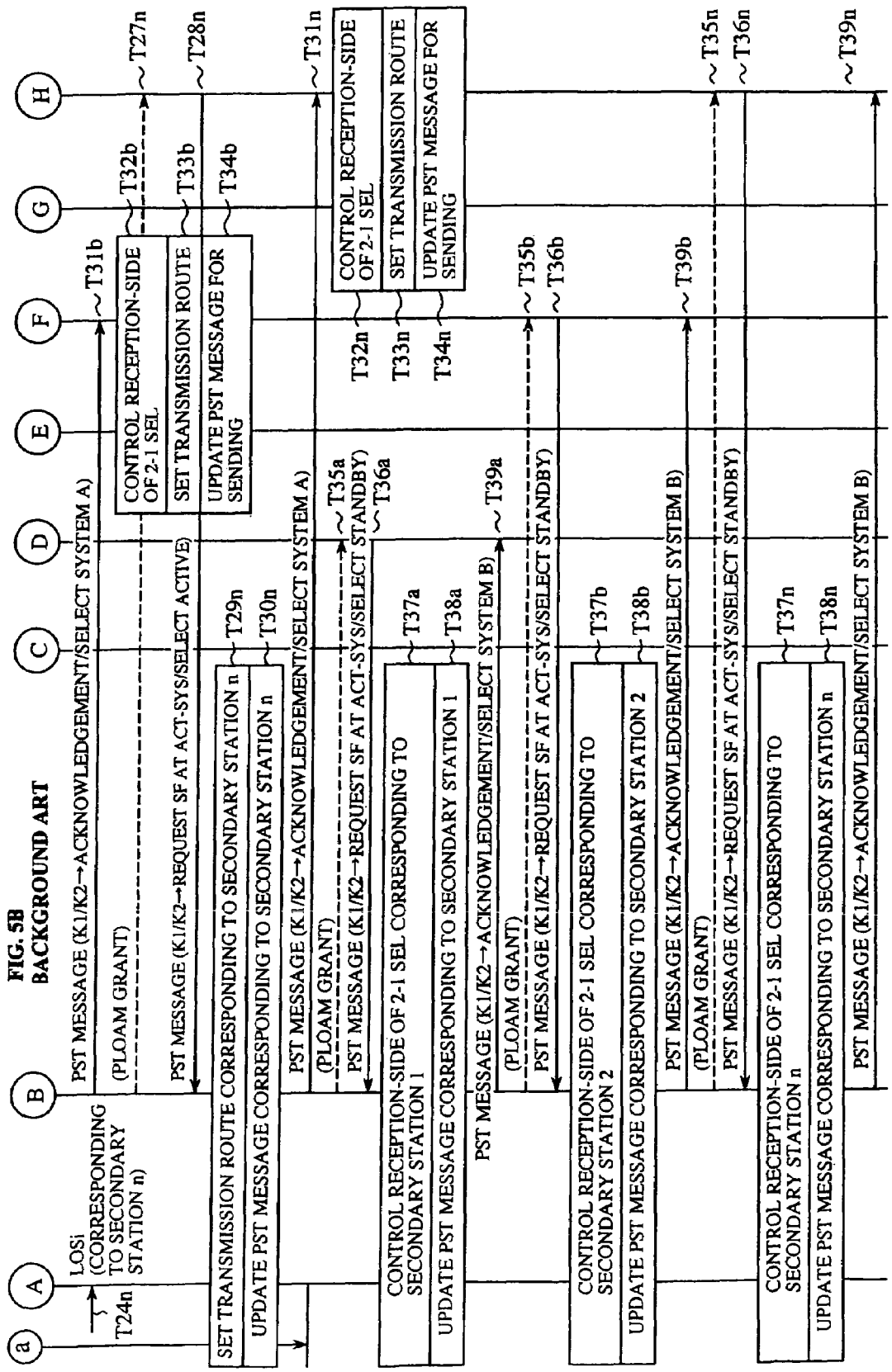

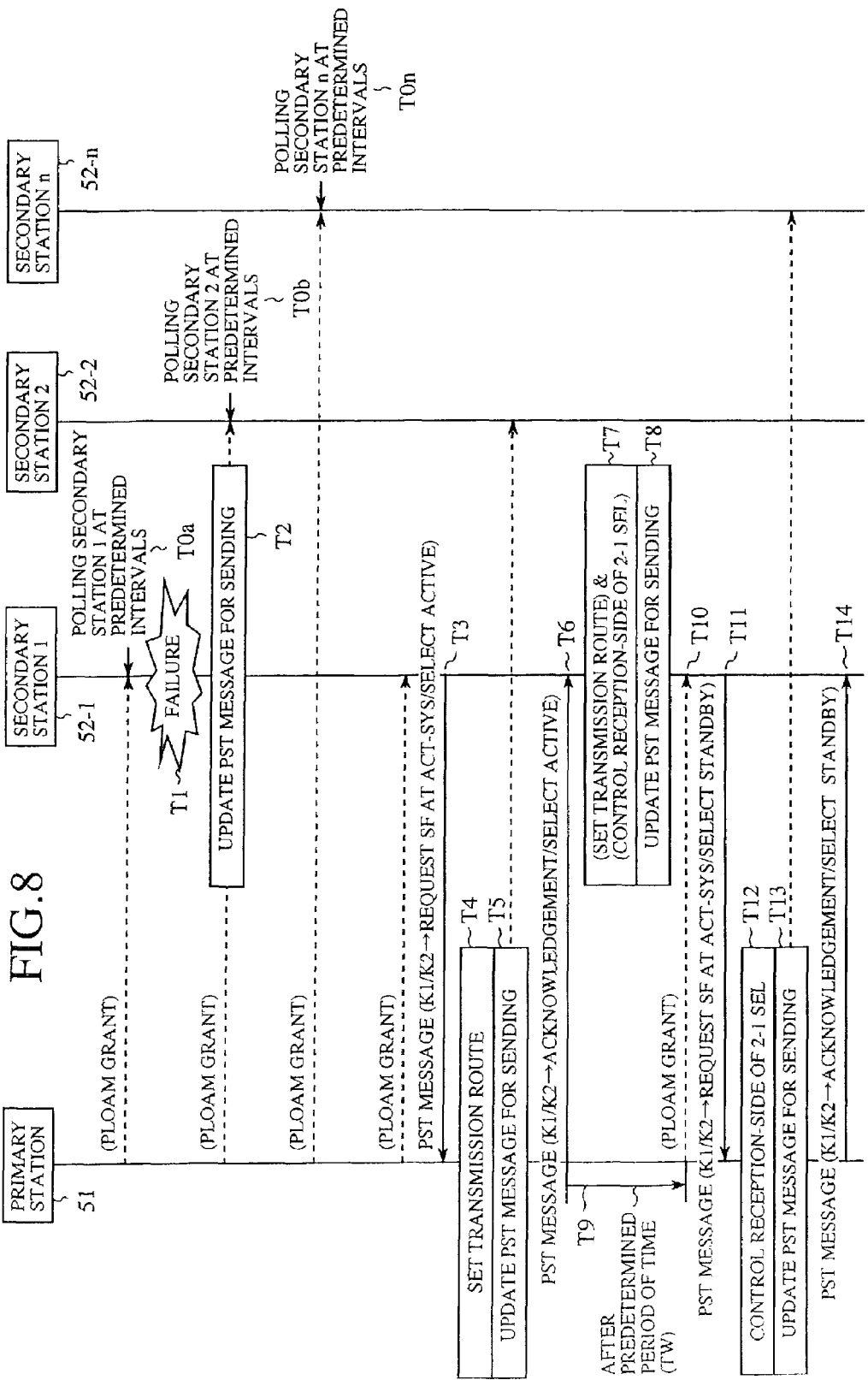

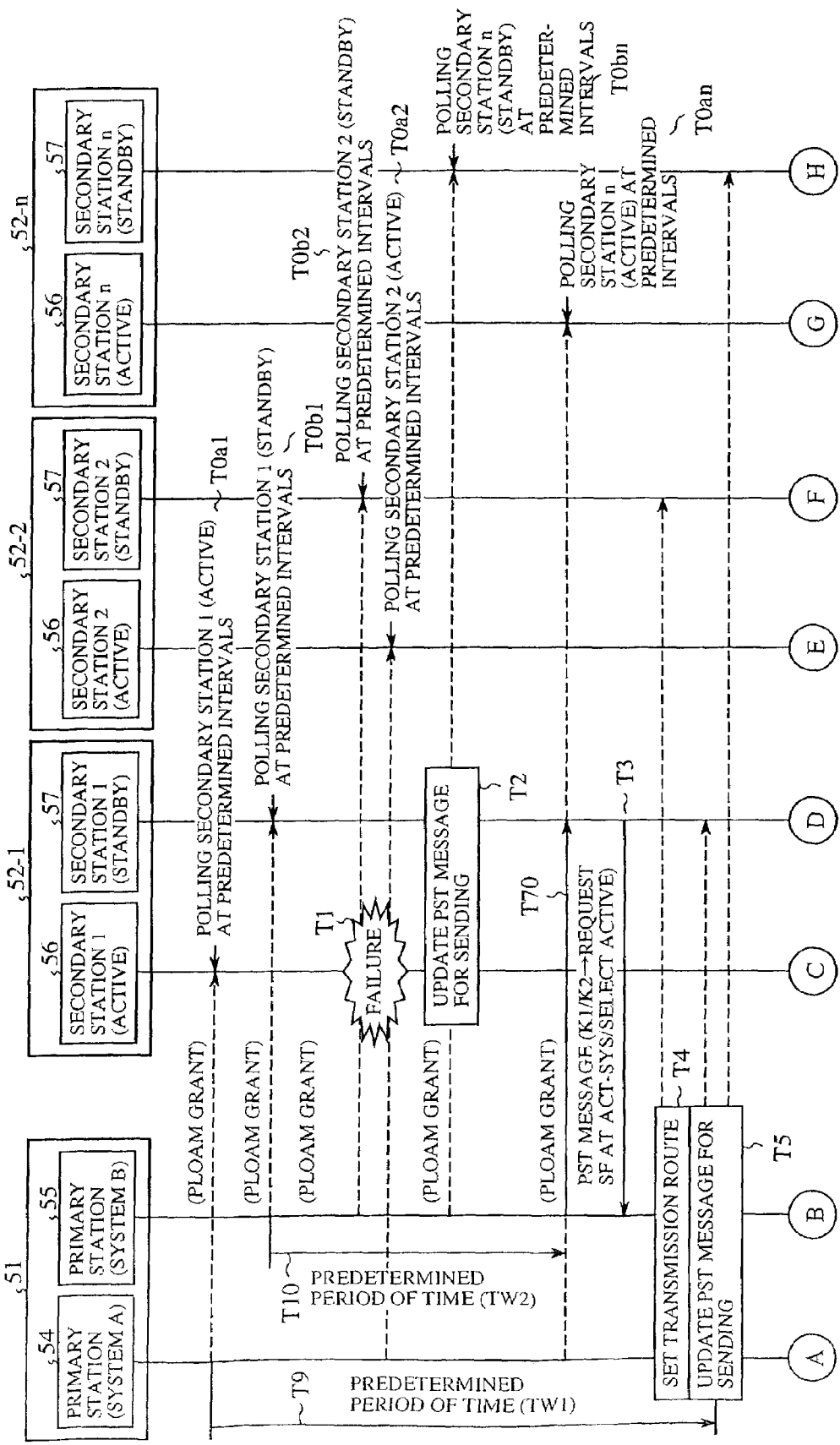

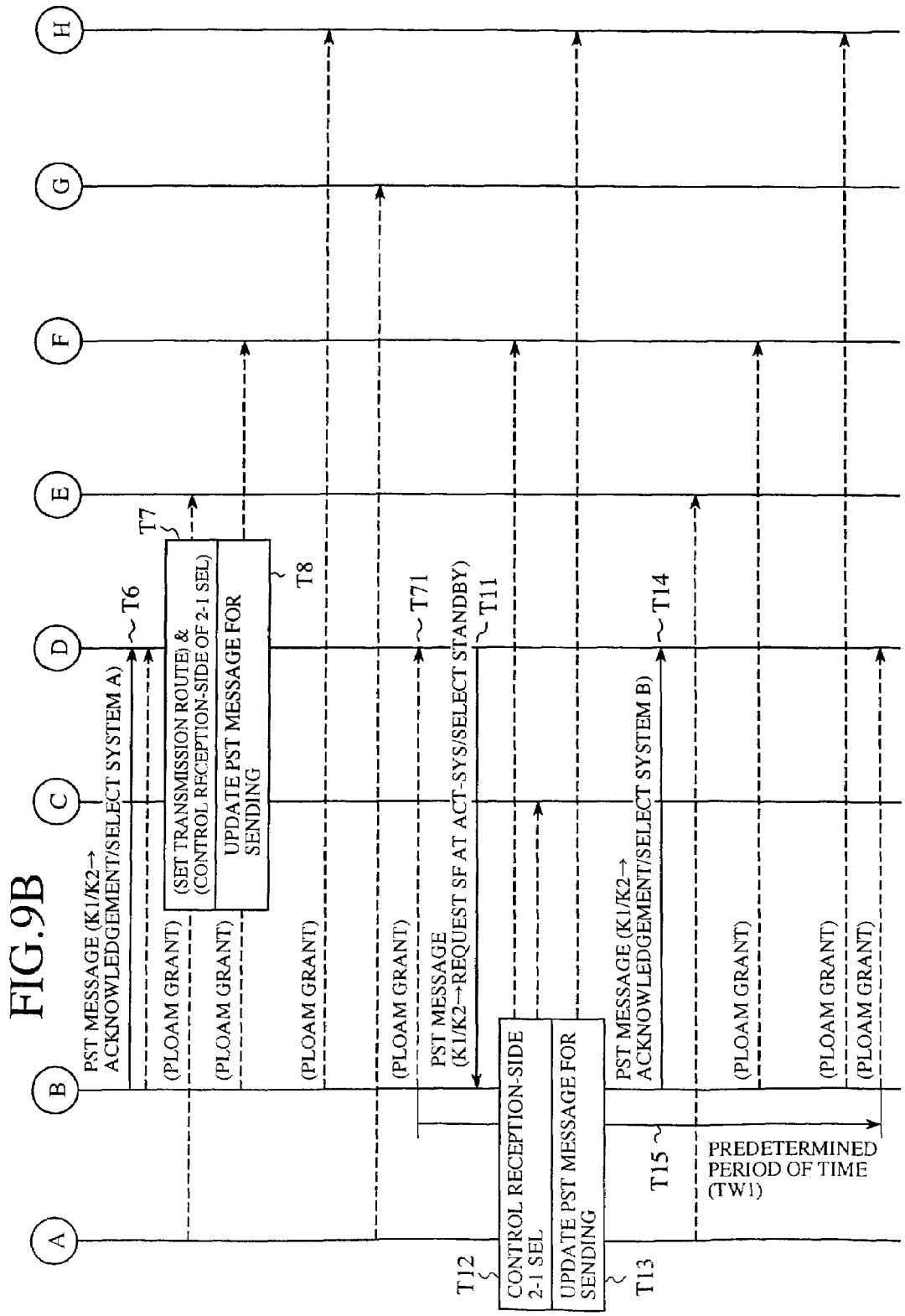

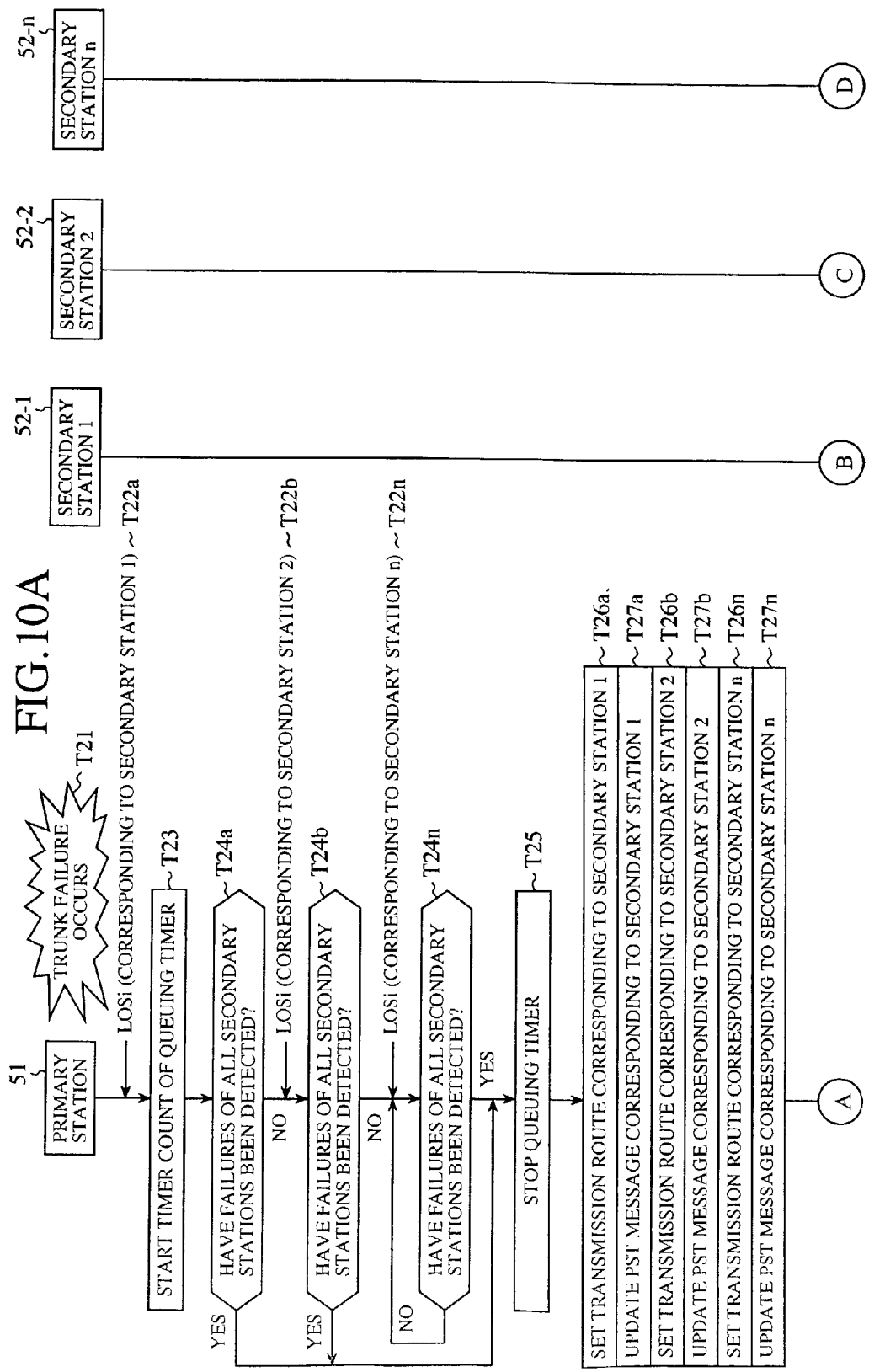

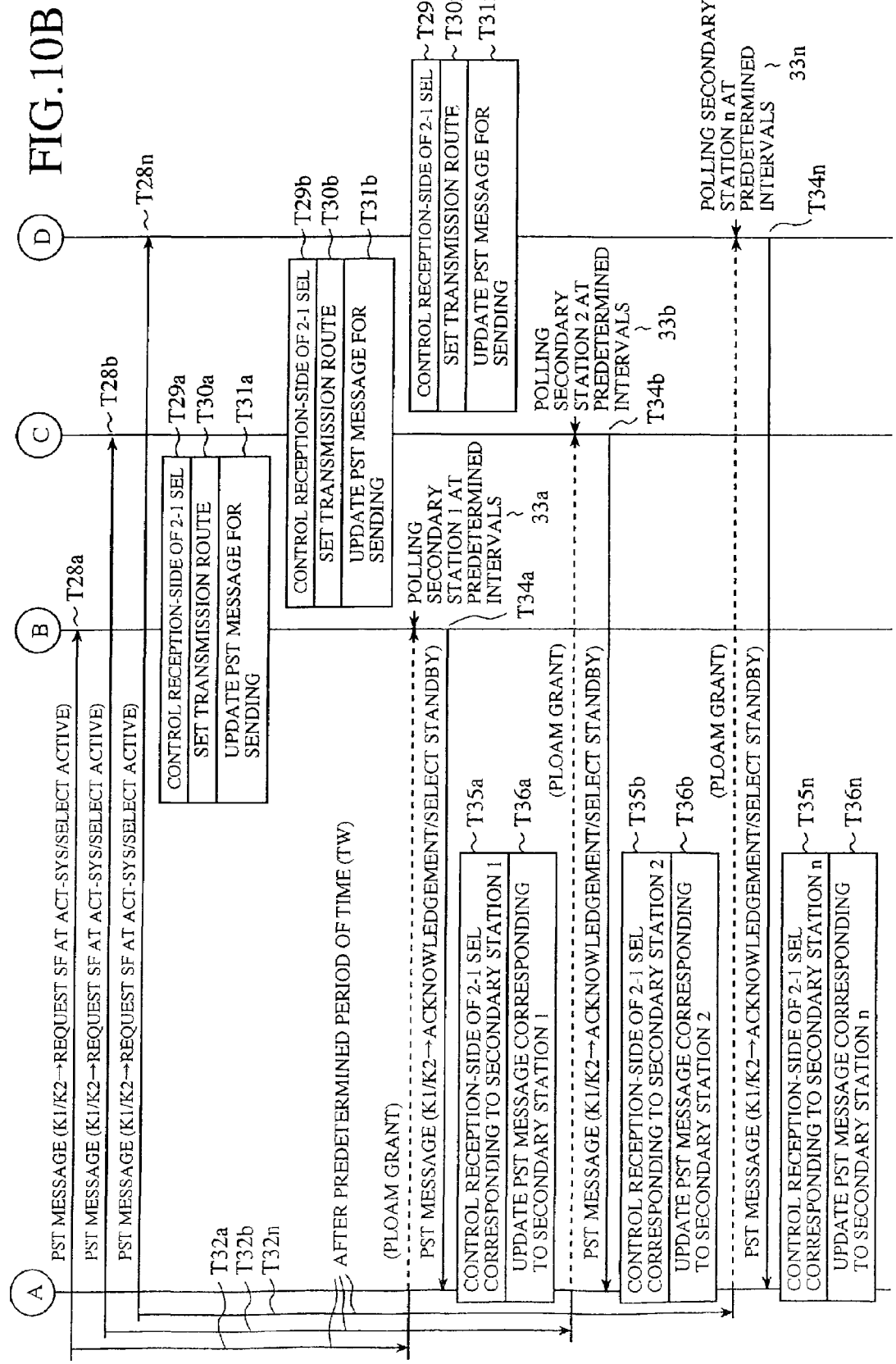

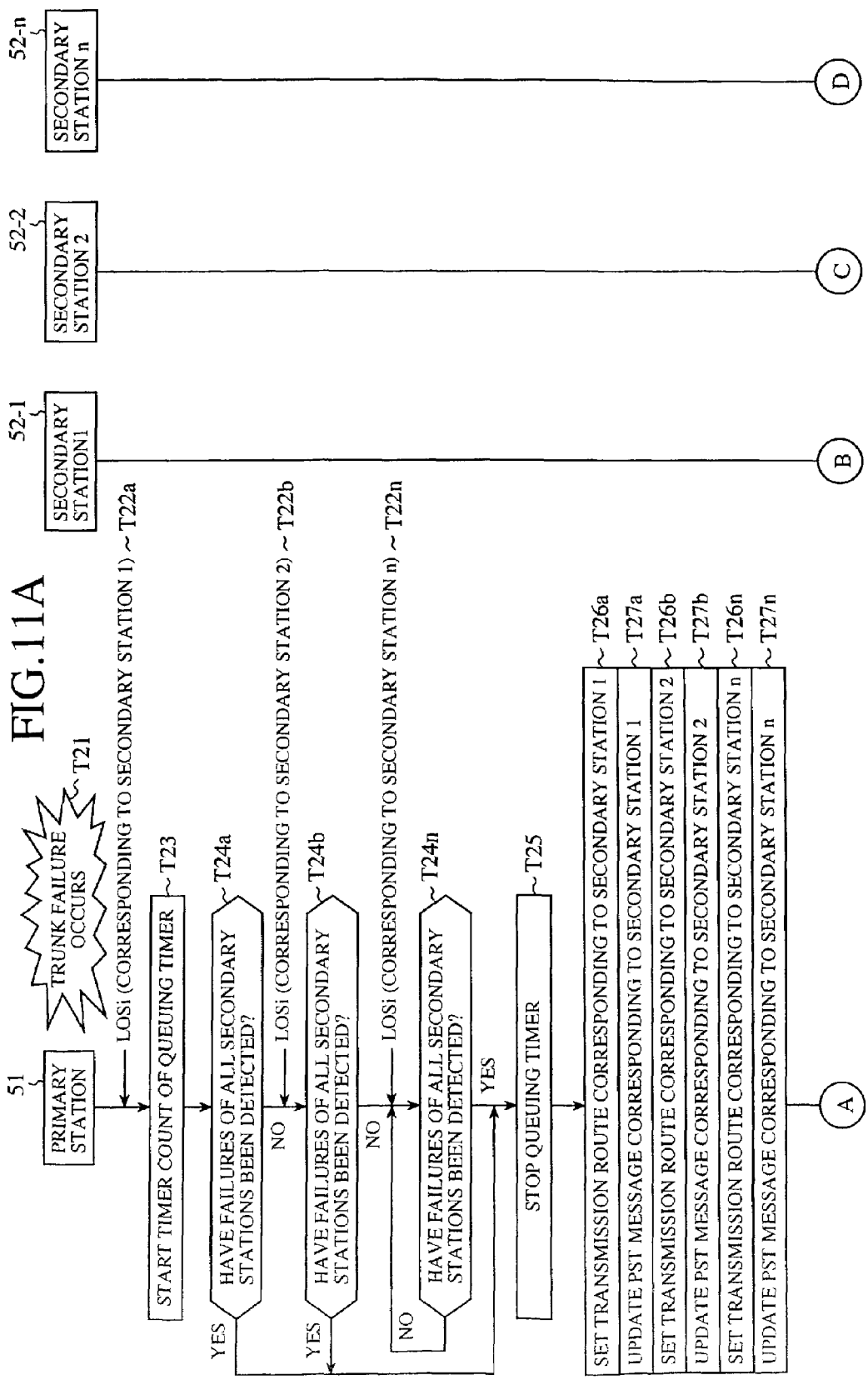

OPTICAL MULTI-BRANCH COMMUNICATION SYSTEM

TECHNICAL FILED OF THE INVENTION

The present invention generally relates to a passive optical network controlling redundant switching in a redundant passive optical network section.

BACKGROUND ART

FIG. 1 shows a configuration of a related-art passive optical network communications system defined in International Telecommunication Union-Telecommunication (ITU-T) Recommendation G.983.1. Referring to FIG. 1, the system comprises a primary station equipment unit 1, secondary station equipment units 2-1-2-$n$, an optical distribution network (ODN) 3 implemented by passive elements such as optical couplers and optical fibers, a primary station line termination 4 for an active system, a primary station line termination 5 for a standby system, a secondary station line termination 6 for an active system and a secondary station line termination 7 for a standby system.

In ITU-T Recommendation G.983.1, a downstream signal is broadcast from the primary station equipment unit 1 to the secondary station equipment units 2-1-2-$n$ over the ODN 3. Upstream signals from the secondary station equipment units 2-1-2-$n$ are multiplexed by the ODN 3 before being sent to the primary station equipment unit 1. The ODN 3 effects access control (delay control) for multiplexing the upstream signals from the secondary station equipment units 2-1-2-$n$. The delay control is also described in ITU-T G. 983.1.

Japanese Laid-Open Patent Application No. 11-122172, which provides a duplex configuration of an optical transmission system at a reduced cost by providing each of the primary station equipment units and secondary station equipment units with a plurality of transceivers operated at mutually different wavelengths and with a system switcher, discloses a redundant switching system for an optical subscriber system. Given in the following, however, is a description of a related-art redundant switching control in a passive optical network (PON) section that conforms to ITU-T Recommendation G.983.1.

FIG. 2 shows a detailed configuration of the related-art passive optical network communications system. Referring to FIG. 2, a secondary station equipment unit 2 is one of the secondary station equipment units 2-1-2-$n$. A 2-1 selector 11 selectively outputs one of a signal received by the primary station line termination 4 for the active system and the primary station line termination 5 for the standby system, under the direction of a selective control unit 13. A route setting unit 12 outputs a main signal to at least one of the primary station line termination 4 for the active system and the primary station line termination 5 for the standby system, under the direction of the selective control unit 13. The selective control unit 13 controls the 2-1 selector 11 and the route setting unit 12, based on K1/K2 bytes included in a PON section trace (PST) message, which is a type of physical layer operations administration and maintenance (PLOAM) message.

PLOAM cell composing units 14 and 15 output the PST message output from the selective control unit 13 to transceivers 18 and 19. Grant generating units 16 and 17 generate PLOAM grants (PLOAM cell transmission enable signals) so as to output the PLOAM grants thus generated to the transceivers 18 and 19. The transceivers 18 and 19 transmit the main signal, the PLOAM cell and the grant to the secondary station equipment unit 2 and also receives the main signal and the PLOAM cell from the secondary station equipment unit 2.

PLOAM cell decomposing units 20 and 21 receive the PLOAM cell received by the transceivers 18 and 19 and output the PST message to the selective control unit 13.

A 2-1 selector 31 selects one of a main signal received by a secondary station line termination 6 for an active system and a main signal received by a secondary station line termination 7 for a standby system, under the direction of a selective control unit 33, so as to output the selected signal. A route setting unit 32 outputs the main signal to at least one of the secondary station line termination 6 for the active system and the secondary station line termination 7 for the standby system, under the direction of the selective control unit 33. The selective control unit 33 controls the 2-1 selector 31 and the route setting unit 32, based on the K1/K2 bytes included in the PST message.

PLOAM cell composing units 34 and 35 output the PLOAM cell including the PST message, supplied from the selective control unit 33, to the transceivers 38 and 39, the timing of output being indicated by the PLOAM grant detected by grant detecting units 36 and 37. The grant detecting units 36 and 37 detect PLOAM grants received by the transceivers 38 and 39. The transceivers 38 and 39 transmit the main signal and the PLOAM cell to the primary station equipment unit 1 and also receives the main signal, the PLOAM cell and the grant from the primary station equipment unit 1. PLOAM cell decomposing units 40 and 41 receive the main signal received by the transceivers 38 and 39 so as to output the PST message to the selective control unit 33.

FIG. 3 shows an example of control effected when a failure occurs in the secondary station equipment unit 2-1. Referring to FIG. 3, the operations of the primary station equipment unit 1 and the secondary station equipment units 2-1-2-$n$ performed in the event of a failure are illustrated along a time line extending in a downward direction in the drawing.

A description will now be given of the operation according to the related art.

An exemplary case where a failure occurs in the secondary station equipment unit 2-1 will be described.

It is assumed that, in a state in which a failure does not occur in the secondary station equipment unit 2-1, the 2-1 selector 11 and the route setting unit 12 select the main signal from the secondary station line termination 6 for the active system and that the 2-1 selector 31 and the route setting unit 32 select the main signal from the primary station line termination 4 for the active system. Thus, the main signal is transmitted and received over the active system.

In a state in which a failure does not occur in the secondary station equipment unit 2-1, the selective control unit 33 of the secondary station equipment unit 2-1 outputs a PST message, comprising the K1 byte indicating that "switching is not requested" and the K2 byte indicating that "the active system is being selected", to the PLOAM cell composing units 34 and 35.

The PLOAM cell including the PST message is transmitted to the primary station equipment unit 1 by the transceivers 38 and 39 of the secondary station equipment unit 2-1. The PLOAM cell thus transmitted is received by the transceivers 18 and 19 of the primary station equipment unit 1 so that the PLOAM cell decomposing units 20 and 21 output the PST message included in the PLOAM cell to the selective control unit 13.

Upon receipt of the PST message from the PLOAM cell decomposing units 20 and 21, the selective control unit 13 of the primary station equipment unit 1 controls the 2-1 selector 11 and the route setting unit 12, based on the PST message thus received.

Since the K1 byte received indicates that "switching is not requested", the selection asserted in the 2-1 selector 11 and the route setting unit 12 is maintained (selection of the active system is maintained).

In a similar configuration as the secondary station equipment unit 2-1, the primary station equipment unit 1 also transmits the PST message, comprising the K1 byte and the K2 byte, to the secondary station equipment unit 2-1. In this example, it is assumed that the primary station equipment unit 1 does not undergo any failure so that the K1 byte indicating that "switching is not requested" continues to be transmitted to the secondary station equipment unit 2-1.

When a failure occurs in the secondary station line termination 6 for the active system in the secondary station equipment unit 2-1 (T1), the selective control unit 33 of the secondary station equipment unit 2-1 updates the PST message so as to include the K1 byte indicating that "switching is being requested due to signal fail (SF)" and the K2 byte indicating that "the active system is being selected". The selective control unit 33 outputs the PST message thus updated to the PLOAM cell composing units 34 and 35 (T2).

The PLOAM cell including the PST message is transmitted to the primary station equipment unit 1 by the transceivers 38 and 39 of the secondary station equipment unit 2-1. The transceiver 19 of the primary station equipment unit 1 receives the PLOAM cell (the PLOAM cell does not arrive at the transceiver 18 since the failure occurred in the active system). The PLOAM cell decomposing unit 21 outputs the PST message included in the PLOAM cell to the selective control unit 13 (T3).

Upon receipt of the PST message from the PLOAM cell decomposing unit 21, the selective control unit 13 of the primary station equipment unit 1 controls the route setting unit 12, based on the PST message.

Since the K1 byte received from the secondary station equipment unit 2-1 indicates that "switching is being requested due to signal fail (SF)", the selective control unit 13 outputs an instruction directing the route setting unit 12 to be switched to the standby system (T4).

The primary station equipment unit 1 updates the K1 byte so as to indicate "acknowledgement" (T5) since it acknowledges at this stage that a failure occurred in the secondary station equipment unit 2-1.

The selective control unit 13 of the primary station equipment unit 1 outputs the PST message, comprising the K1 byte indicating "acknowledgement" and the K2 byte indicating that "the active system is being selected", to the PLOAM cell composing units 14 and 15.

The PLOAM cell including the PST message is transmitted by the transceivers 18 and 19 of the primary station equipment unit 1 to the secondary station equipment unit 2-1. The transceiver 39 of the secondary station equipment unit 2-1 receives the PLOAM cell. The PLOAM cell decomposing unit 41 outputs the PST message included in the PLOAM cell to the selective control unit 33 (T6).

Upon receipt of the PST message from the PLOAM cell decomposing unit 41, the selective control unit 33 of the secondary station equipment unit 2-1 controls the 2-1 selector 31 and the route setting unit 32, based on the PST message.

Since the K1 byte received indicates "acknowledgement", the selective control unit 13 outputs an instruction directing the 2-1 selector 31 and the route setting unit 32 to be switched to the standby system (T7).

The selective control unit 33 of the secondary station equipment unit 2-1 updates the PST message so as to include the K1 byte indicating that "switching is being requested due to signal fail (SF)" and the K2 byte indicating that "the standby system is being selected" and outputs the PST message thus updated to the PLOAM cell composing units 34 and 35 (T8).

The primary station equipment unit 1 transmits PLOAM grants (PLOAM cell transmission enable signals) to the secondary station equipment units 2-1-2-n at predetermined intervals so as to receive PLOAM cells from the secondary station equipment 2-1-2-n (T0a, T0b, T0n).

ITU-T Recommendation G.983.1 recommends that the primary station equipment unit 1 and the secondary station equipment unit 2 transmit the PST message at predetermined intervals (for example, one message per second).

The selective control unit 33 of the secondary station equipment unit 2-1 outputs the PST message, comprising the K1 byte indicating that "switching is being requested due to signal fail (SF)" and the K2 byte indicating that "the standby system is being selected", to the PLOAM cell composing units 34 and 35. Actually, the transmission of the PST message to the primary station equipment unit 1 is deferred until T71 when the PLOAM grant is received (T11).

The PLOAM cell including the above PST message is received by the transceiver 19 of the primary station equipment unit 1, where the PLOAM cell decomposing unit 21 outputs the PST message included in the PLOAM cell to the selective control unit 13.

The selective control unit 13 of the primary station equipment unit 1 receiving the PST message from the PLOAM cell decomposing unit 21 controls the 2-1 selector 11, based on the PST message.

Since the K2 byte received from the secondary station equipment unit 2-1 indicates that "the standby system is being selected", the selective control unit 13 outputs an instruction directing the 2-1 selector 11 to be switched to the standby system (T12). Subsequently, the main signal is transmitted and received over the standby system.

Finally, the selective control unit 13 of the primary station equipment unit 1 updates the PST message so as to include the K1 byte indicating "acknowledgement" and the K2 byte indicating that "the standby system is being selected". The selective control unit 13 outputs the PST message to the PLOAM cell composing units 14 and 15 (T13).

The PLOAM cell including the PST message is transmitted to the secondary station equipment unit 2-1 by the transceivers 18 and 19 of the primary station equipment unit (T14). The transceiver 39 of the secondary station equipment unit 2-1 receives the PLOAM cell. The PLOAM cell decomposing unit 41 outputs the PST message included in the PLOAM cell to the selective control unit 33, thus completing a redundancy switching sequence.

Referring to T71-T11, when a preceding PLOAM cell awaits transmission in the PLOAM cell inserting unit 35 of the secondary station equipment unit 2-1 before the above PST message, the PLOAM grant from the primary station equipment unit 1 is used for transmission of the PLOAM cell that is waiting. The above PST message naturally has to wait until a next PLOAM grant is received (not shown).

A description will now be given of a second example of related-art system.

FIGS. 4a and 4B show how a failure occurring in the ODN 3 coupled to the primary station equipment unit 1 is dealt with. Referring to FIGS. 4A and 4B, the operations of the primary station equipment unit 1 and the secondary station equipment units 2-1-2-*n* occurring in the event of a failure are illustrated along a time line extending in a downward direction in the drawing.

A description will now be given of the operation according to the second example of related-art system.

An exemplary case where a failure (hereinafter, referred to as a trunk failure) occurs between an optical coupler and the primary station line termination 4 for the active system.

It is assumed that, in a state in which a trunk failure does not occur, the 2-1 selector 11 and the route setting unit 12 select the main signal from the secondary station line termination 6 for the active system and. the 2-1 selector 31 and the route setting unit 32 select the main signal from the primary station line termination 4 for the active system. Thus, the main signal is transmitted and received over the active system.

When a trunk failure occurs (T21), the primary station line termination 4 for the active system in the primary station equipment unit 1 detects a failure (for example, LOSi: loss of signal) corresponding to the secondary station equipment unit 2-1 (T22*a*).

The selective control unit 13 of the primary station equipment unit 1 detecting the failure in the active system outputs an instruction directing the route setting unit 12 to be switched to the standby system (T26*a*).

Since the failure detected corresponds to the secondary station equipment unit 2-1, the selective control unit 13 of the primary station equipment unit 1 updates the PST message so as to include the K1 byte indicating that "switching is being requested due to signal fail (SF)" and the K2 byte indicating that "the active system is being selected" (T27*a*).

The selective control unit 13 of the primary station equipment unit 1 outputs the PST message, comprising the K1 byte indicating that "switching is being requested due to signal fail (SF)" and the K2 byte indicating that "the active system is being selected", to the PLOAM cell composing units 14 and 15.

The PLOAM cell including the PST message is transmitted to the secondary station equipment unit 2-1 by the transceivers 18 and 19 of the primary station equipment unit 1. The transceiver 39 of the secondary station equipment unit 2-1 receives the PLOAM cell (the PLOAM cell does not arrive at the transceiver 38 since the failure occurred in the active system). The PLOAM cell decomposing unit 41 outputs the PST message included in the PLOAM cell to the selective control unit 33 (T28*a*).

The selective control unit 33 of the secondary station equipment unit 2-1 receiving the PST message from the PLOAM cell decomposing unit 41 controls the 2-1 selector 31 and the route setting unit 32, based on the PST message.

Since the K1 byte received indicates that "switching is being requested due to signal fail (SF)", the selective control unit 33 outputs an instruction directing the 2-1 selector 31 and the route setting unit 32 to be switched to the standby system (T29*a*-T30*a*).

Since the selective control unit 33 of the secondary station equipment unit 2-1 has acknowledged the detection of a failure by the primary station equipment unit 1, the selective control unit 33 updates the PST message so as to include the K1 byte indicating "acknowledgement" and the K2 byte indicating that "the standby system is being selected". The selective control unit 33 outputs the PST thus updated to the PLOAM cell composing units 34 and 35 of the secondary station equipment unit (T31*a*).

The primary station equipment unit 1 transmits the PLOAM grant (PLOAM cell transmission enable signal) to the secondary station equipment units 2-1-2-*n* at predetermined intervals so as to receive PLOAM cells from the secondary station equipment units 2-1-2-*n*.

ITU-T Recommendation G. 983.1 recommends that the primary station equipment unit 1 and the secondary station equipment units 2-1-2-*n* transmit the PST message at predetermined intervals (for example, one message per second).

The selective control unit 33 of the secondary station equipment unit 2-1 outputs the PST message, comprising the K1 byte indicating "acknowledgement" and the K2 byte indicating that "the standby system is being selected", to the PLOAM cell composing units 34 and 35. Actually, the transmission of the PST message is deferred until T81*a* when the PLOAM grant is received (T34*a*).

The PLOAM cell including the above PST message is received by the transceiver 19 of the primary station equipment unit 1, where the PLOAM cell decomposing unit 21 outputs the PST message included in the PLOAM cell to the selective control unit 13 (T34*a*).

The selective control unit 13 of the primary station equipment unit 1 receiving the PST message from the PLOAM cell decomposing unit 21 controls the 2-1 selector 11, based on the PST message.

Since the K2 byte received indicates that "the standby system is being selected", the selective control unit 13 outputs an instruction directing the 2-1 selector 11 to be switched to the standby system (T35*a*). Subsequently, the main signal is transmitted over the standby system.

Finally, the selective control unit 13 of the primary station equipment unit 1 updates the PST message so as to include the K1 byte indicating that "switching is being requested due to signal fail (SF)" and the K2 byte indicating that "the standby system is being selected". The selective control unit 13 outputs the PST message thus updated to the PLOAM cell composing units 14 and 15 (T36*a*).

The PLOAM cell including the PST message is transmitted to the secondary station equipment unit 2-1 by the transceivers 18 and 19 of the primary station equipment unit (T14). The transceiver 39 of the secondary station equipment unit 2-1 receives the PLOAM cell. The PLOAM cell decomposing unit 41 outputs the PST message included in the PLOAM cell to the selective control unit 33, thus completing a redundancy switching sequence (not shown).

Since a trunk failure occurs at T21, the primary station line termination 4 for the active system in the primary station equipment unit 1 simultaneously detects failures (for example, LOSi) corresponding to the other secondary station equipment units 2-2, 2-*n*. The primary station equipment unit 1 performs redundancy switching corresponding to the other secondary station equipment units 2-2, 2-*n* (T22*b*-T36*b*, 81*b*, T22*n*-T36*n*, T81*n*) as well as that for the secondary station equipment unit 2-1 (T22*a*-T36*a*, T81*a*).

A description will now be given of a third example of related-art system.

FIGS. 5A and 5B show how a failure occurring in the ODN 3 coupled to the primary station equipment unit 1 is dealt with. Referring to FIGS. 5A and 5B, the operations of the primary station equipment unit 1 and the secondary station equipment units 2-1-2-*n* occurring in the event of a failure are illustrated along a time line extending in a downward direction in the drawing. In the third example of related-art system, the primary station line termination 4 for the active system is referred to as the primary station line termination 4 for system A and the primary station line termination 5 for the standby system is referred to as the primary system signal termination 5 for system B.

A description will now be given of the operation according to the third example of related-art system.

An exemplary case where a failure (hereinafter, referred to as a trunk failure) occurs between an optical coupler and the primary station line termination 4 for system A.

It is assumed that, in a state in which a trunk failure does not occur, the 2-1 selector 11 and the route setting unit 12 select the main signal from the secondary station line termination 6 for the active system and the 2-1 selector 31 and the route setting unit 32 select the main signal from the primary station line termination 4 for system A. Thus, the main signal is transmitted and received over system A.

When a trunk failure occurs (T21), each of the secondary station equipment units 2-1-2-$n$ detects the failure (for example, LOS: loss of signal in the secondary station equipment unit) corresponding to the secondary station line termination 6 for the active system (T22$a$, T22$b$, T22$n$).

The secondary station line termination 6 of the secondary station equipment units 2-1-2-$n$ acknowledges the failure in the active system after a predetermined guard time (TW1, TW2, TWn) so as to execute a redundant switching sequence (T23$a$, T23$b$, T23$n$).

A passive optical network communications system that complies with ITU-T Recommendation G. 983.1 is configured to stop the transmission to the primary station equipment unit 1 after the secondary station equipment units 2-1-2-$n$ detect a failure in a transmission path. Therefore, the primary station equipment unit 1 also detects the transmission failure corresponding to the secondary station equipment units 2-1-2-$n$. At this stage, the primary station line termination 4 of system A does not detect the failure corresponding to the secondary station equipment units 2-1-2-$n$ (T24$a$, T24$b$, T24$n$). Since a redundancy switching sequence is being executed in response to a request from the secondary station equipment units 2-1-2-$n$, the failure detected by the primary station equipment unit 1 after a predetermined period of guard time TW is neglected (T25).

Since the selective control unit 33 of the secondary station equipment unit 2-1 detected the failure in the active system, it updates the PST message so as to include the K1 byte indicating that "switching is being requested due to signal fail (SF)" and the K2 byte indicating that "the active system is being selected" (T26$a$).

The primary station equipment unit 1 transmits the PLOAM grant (PLOAM cell transmission enable signal) to the secondary station equipment units 2-1-2-$n$ at predetermined intervals so as to receive the PLOAM (physical layer operation and management) cells from the secondary station equipment units 2-1-2-$n$.

ITU-T Recommendation G. 983.1 recommends that the primary station equipment unit 1 and the secondary station equipment units 2-1-2-$n$ transmit the PST message at predetermined intervals (for example, one message per second).

The selective control unit 33 of the secondary station equipment unit 2-1 outputs the PST message, comprising the K1 byte indicating that "switching is being requested due to signal fail (SF)" and the K2 byte indicating that "the active system is being selected", to the PLOAM cell composing units 34 and 35 for the active system and the standby system, respectively. Actually, the transmission of the message by the transceivers 38 and 39 of the secondary station equipment unit 2-1 to the primary station equipment unit 1 is deferred until T27$a$ when the PLOAM grant is received (T28$a$).

The transceiver 19 of the primary station equipment unit 1 receives the PLOAM cell including the PST message (since the trunk failure occurs in the active system, the PLOAM cell does not arrive at the transceiver 18). The PLOAM cell decomposing unit 21 outputs the PST message included in the PLOAM cell to the selective control unit 13.

Upon receipt of the PST message from the PLOAM cell decomposing unit 21, the selective control unit 13 of the primary station equipment unit 1 controls the route setting unit 12, based on the PST message.

Since the K1 byte received from the secondary station equipment unit 2-1 indicates that "switching is being requested due to signal fail (SF)", the selective control unit 13 outputs an instruction directing the route setting unit 12 to be switched to system B (T29$a$).

Since the selective control unit 13 of the primary station equipment unit 1 has acknowledged the failure corresponding to the secondary station equipment unit 2-1, it updates the PST message so as to include the K1 byte indicating "acknowledgement" and the K2 byte indicating "system A is being selected" (T30$a$).

The selective control unit 13 of the primary station equipment unit 1 outputs the PST message, comprising the K1 byte indicating "acknowledgement" and the K2 byte indicating that "system A is being selected", to the PLOAM cell composing units 14 and 15 for system A and system B, respectively.

The PLOAM cell including the PST message is transmitted by the transceivers 18 and 19 of the primary station equipment unit 1 to the secondary station equipment unit 2-1. The transceiver 39 of the secondary station equipment unit 2-1 receives the PLOAM cell. The PLOAM cell decomposing unit 41 outputs the PST message included in the PLOAM cell to the selective control unit 33 (T31$a$).

Upon receipt of the PST message from the PLOAM cell decomposing unit 41, the selective control unit 33 of the secondary station equipment unit 2-1 controls the 2-1 selector 31 and the route setting unit 32, based on the PST message.

Since the K1 byte received indicates "acknowledgement", the selective control unit 33 outputs an instruction directing the 2-1 selector 31 and the route setting unit 32 to be switched to the standby system (T32$a$, T33$a$).

The selective control unit 33 of the secondary station equipment unit 2-1 updates the PST message so as to include the K1 byte indicating that "switching is being requested due to signal fail (SF)" and the K2 byte indicating that "the standby system is being selected". The selective control unit 33 outputs the PST message thus updated to the PLOAM cell decomposing units 34 and 35 for the active system and the standby system, respectively (T34$a$).

The transmission of the PLOAM cell including the PST message from the transceiver 39 of the secondary station equipment 2-1 to the primary station equipment unit 1 is deferred until T35$a$ when the PLOAM grant is received.

The PLOAM cell including the PST message is received by the transceiver 19 of the primary station equipment unit 1, where the PLOAM cell decomposing unit 21 outputs the PST message included in the PLOAM cell to the selective control unit 13 (T36$a$).

Upon receipt of the PST message from the PLOAM cell decomposing unit 21, the selective control unit 13 of the primary station equipment unit 1 controls the 2-1 selector 11, based on the PST message.

Since the K2 byte received indicates that "the standby system is being selected", the selective control unit 13 outputs an instruction directing the 2-1 selector 11 to be switched to system B (T37$a$). Subsequently, the main signal is, transmitted and received over the standby system and system B.

Finally, the selective control unit 13 of the primary station equipment unit 1 updates the PST message so as to include the K1 byte indicating "acknowledgement" and the K2 byte indicating that "system B is being selected" to the PLOAM cell composing units 14 and 15 (T38$a$).

The PLOAM cell including the PST message is transmitted by the transceivers 18 and 19 of the primary station equipment to the secondary station equipment unit 2-1 (T39*a*). The PLOAM cell is received by the transceiver 39 of the secondary station equipment unit 2-1 where the PLOAM cell decomposing unit 41 outputs the PST message included in the PLOAM cell to the selective control unit 33, thus completing a redundancy switching sequence.

Since the trunk failure occurs at T21, the other secondary station line terminations 2-2, 2-*n* simultaneously detect failures (for example, LOS) corresponding to the secondary station line terminations 6-2, 6-*n* for the active system. In a similar configuration as the secondary station equipment unit 2-1, the secondary station equipment units 2-2, 2-*n* perform redundancy switching in accordance with the timing designated by the PLOAM grant from the primary station equipment unit 1 (T26*b*-T39*b*, T26*n*-T39*n*).

According to the related-art passive optical network communications systems configured as described above, the primary station equipment unit 1 transmits the PLOAM grant (PLOAM cell transmission enable signal) to the secondary station equipment units 2-1-2-*n* at predetermined intervals. The secondary station equipment units 2-1-2-*n* transmit the PST message to the primary station equipment unit 1 in accordance with the timing designated by the PLOAM grant. The configuration described above generates a queuing time in which each of the secondary station equipment units 2-1-2-*n* has to wait for the reception of the PLAOM grant. Thus, a relatively long period of time is required for redundancy switching.

In the redundancy switching process shown in FIGS. 4A and 4B, whenever the primary station equipment unit 1 detects a failure occurring in a trunk portion of the ODN 3 and corresponding to one of the secondary station equipment unit, redundancy, switching is executed for the secondary station equipment unit corresponding to the failure. Therefore, a relatively long period of time is required before the redundancy switching process is completed for the entirety of the secondary station equipment units 2-1-2-*n*.

According to the redundancy switching process of FIGS. 5A and 5B, a failure occurring in the trunk portion of the ODN 3 is processed such that the secondary station equipment units 2-1-2-*n* detect the failure earlier than the primary station equipment unit 1. Therefore, the primary station equipment unit 1 responds individually to a redundancy switching request from each of the secondary station equipment units to perform individual redundancy switching processes. As a result, a relatively long period of time is required before redundancy switching is completed for the entirety of the secondary station equipment units 2-1-2-*n*.

The present invention has been developed in order to resolve the aforementioned problems and has an objective of providing a passive optical network communications system in which a time required for redundancy switching for the secondary station equipment units is reduced.

DISCLOSURE OF THE INVENTION

According to the passive optical network communications system of the invention, a primary station equipment unit transmits, to a secondary station equipment unit, a message transmission enable signal granting transmission of an upstream message from the secondary station equipment unit, when a predetermined period of time defined for transmission elapses after the primary station equipment unit transmitted a downstream message in a redundancy switching process.

With this, the time required for a process of redundancy switching in the secondary station equipment unit is reduced.

According to another aspect of the invention, the primary station equipment unit repeats the transmission of the message transmission enable signal each time a predetermined period of time for transmission elapses until the upstream message is received from the secondary station equipment unit.

With this, it is ensured that the upstream message from the secondary station equipment unit is received.

According to still another aspect of the invention, the primary station equipment unit learns, when performing the redundancy switching process corresponding to the secondary station equipment unit, redundancy switching processing, time, which is a time required for the secondary station equipment unit to perform the redundancy switching process, so as to adjust the timing for transmission to the secondary station equipment unit.

With this, generation of excessive number of the message transmission enable signals is prevented.

According to another aspect of the invention, the primary station equipment unit initializes the redundancy switching processing time when a predetermined condition is met.

With this, generation of the message transmission enable signal is optimally timed.

According to the passive optical network communications system of the invention, the primary station equipment unit transmits a message transmission enable signal to the secondary station equipment unit granting transmission of an upstream message from the secondary station equipment unit, a period of transmission of the message transmission enable signal to the secondary station equipment unit for a standby system being shorter than a period of transmission of the message transmission enable signal to the secondary station equipment unit for an active system.

With this, the time required for the process of redundancy switching in the secondary station equipment unit is reduced without affecting the transmission of a main signal of the secondary station equipment unit in the active system.

According to the passive optical network communications system of the invention, when a primary station equipment unit detects a failure corresponding to any of a plurality of secondary station equipment units, the primary station equipment unit waits until the failures corresponding to the entirety of the plurality of secondary station equipment units are detected, and performs a redundancy switching process for the secondary station equipment unit for which the failure is detected after a predetermined period of time.

With this, the time required for process of redundancy switching is further reduced.

According to another aspect of the invention, the primary station equipment performs the redundancy switching process for the secondary station equipment units for which the failure is detected in a single series of steps.

With this, the time required for process of redundancy switching is further reduced.

According to still another aspect of the invention, the primary station equipment unit waits until the upstream messages are received from the secondary station equipment units for each of which the failure is detected, so that the redundancy switching processes for the secondary station equipment units are executed in a single series of steps.

With this, the time required for process of redundancy switching is further reduced.

According to the passive optical network communications system of the invention, the primary station equipment unit detects a failure corresponding to the secondary station equipment unit and starts a redundancy switching process after a guard time which is shorter than a guard time of the secondary station equipment unit.

With this, the time required for the process of redundancy switching in the primary station equipment unit and in the secondary station equipment unit is reduced.

BRIEF DESCRIPTION OF THE DRAWINGS

FIG. 3 shows an example of how an occurrence of a failure in the secondary station equipment units 2-1 is dealt with.

FIGS. 4A and 4B show how a failure occurring in the ODN 3 coupled to the primary station equipment unit 1 is deal with.

FIGS. 5A and 5B show how a failure occurring in the ODN 3 coupled to the primary station equipment unit 1 is dealt with.

FIG. 8 shows how a failure occurring in a secondary station equipment unit 52-1 is dealt with.

FIGS. 9A and 9B show how a failure occurring in the secondary station equipment unit 52-1 is dealt with.

FIGS. 10A and 10B show how a failure occurring in an ODN 53 coupled to a primary station equipment unit 51 is dealt with.

FIGS. 11A and 11B show how a failure occurring in the ODN 53 coupled to the primary station equipment unit 51 is dealt with.

FIGS. 12A and 12B show how a failure occurring in the ODN 53 coupled to the primary station equipment unit 51 is dealt with.

BEST MODE OF CARRYING OUT THE INVENTION

A description will now be given of the best mode of carrying out the invention with reference to the attached drawings by disclosing details of the invention.

FIRST EMBODIMENT

Figure 1:
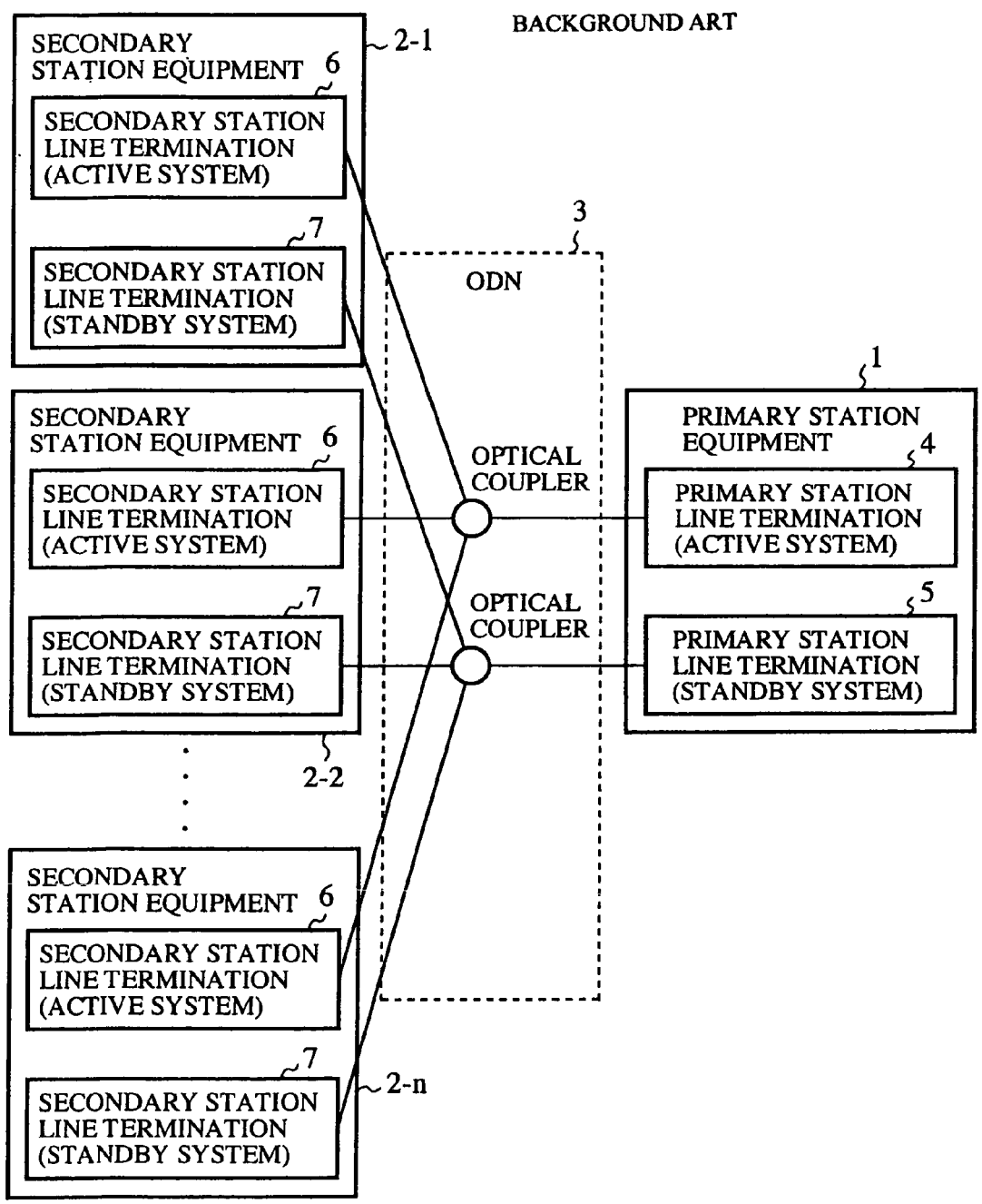
FIG. 1 shows a configuration of a passive optical communications system according to the related art.
Figure 2:
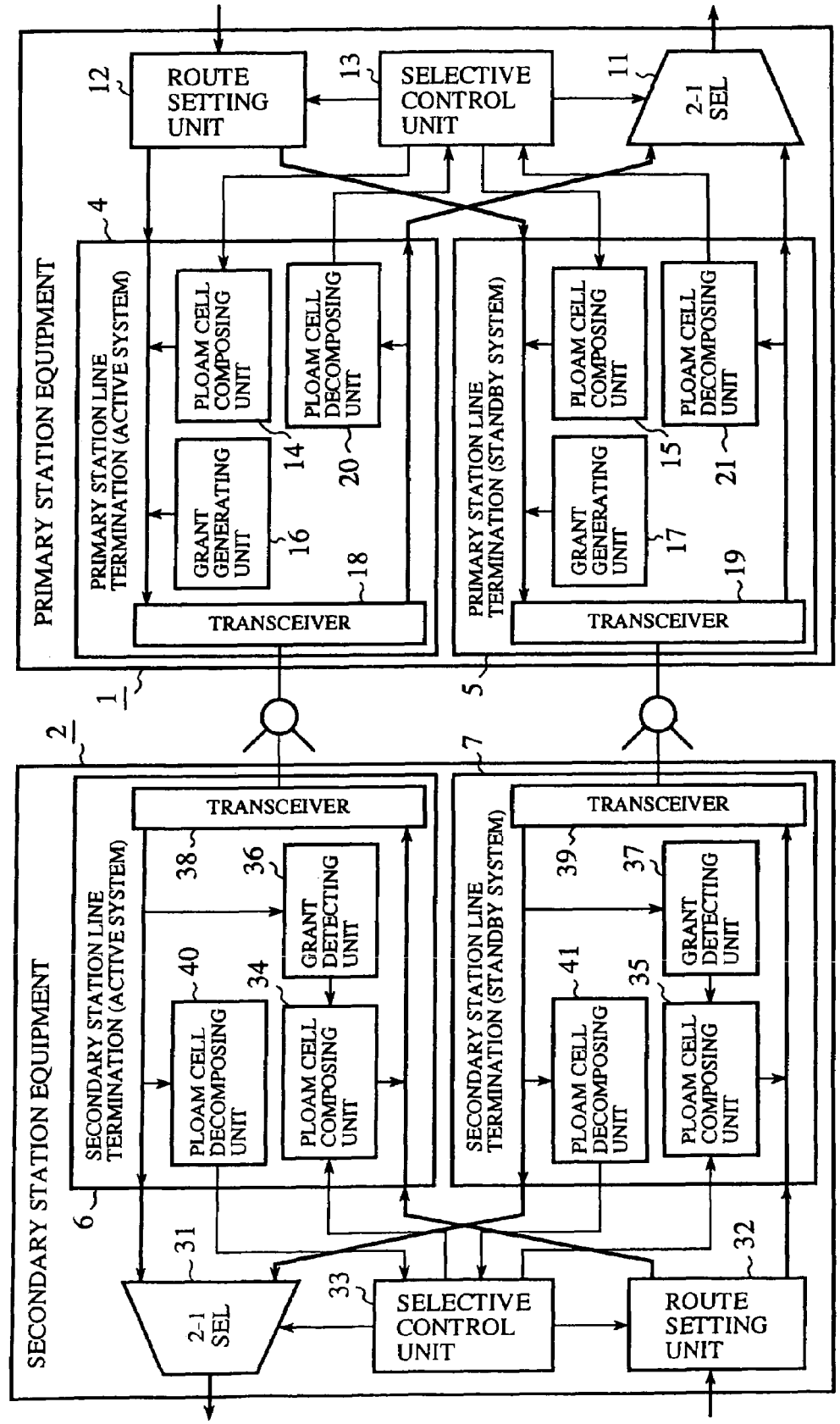
FIG. 2 shows a detailed configuration of the related-art passive optical communications system.
Figure 3:
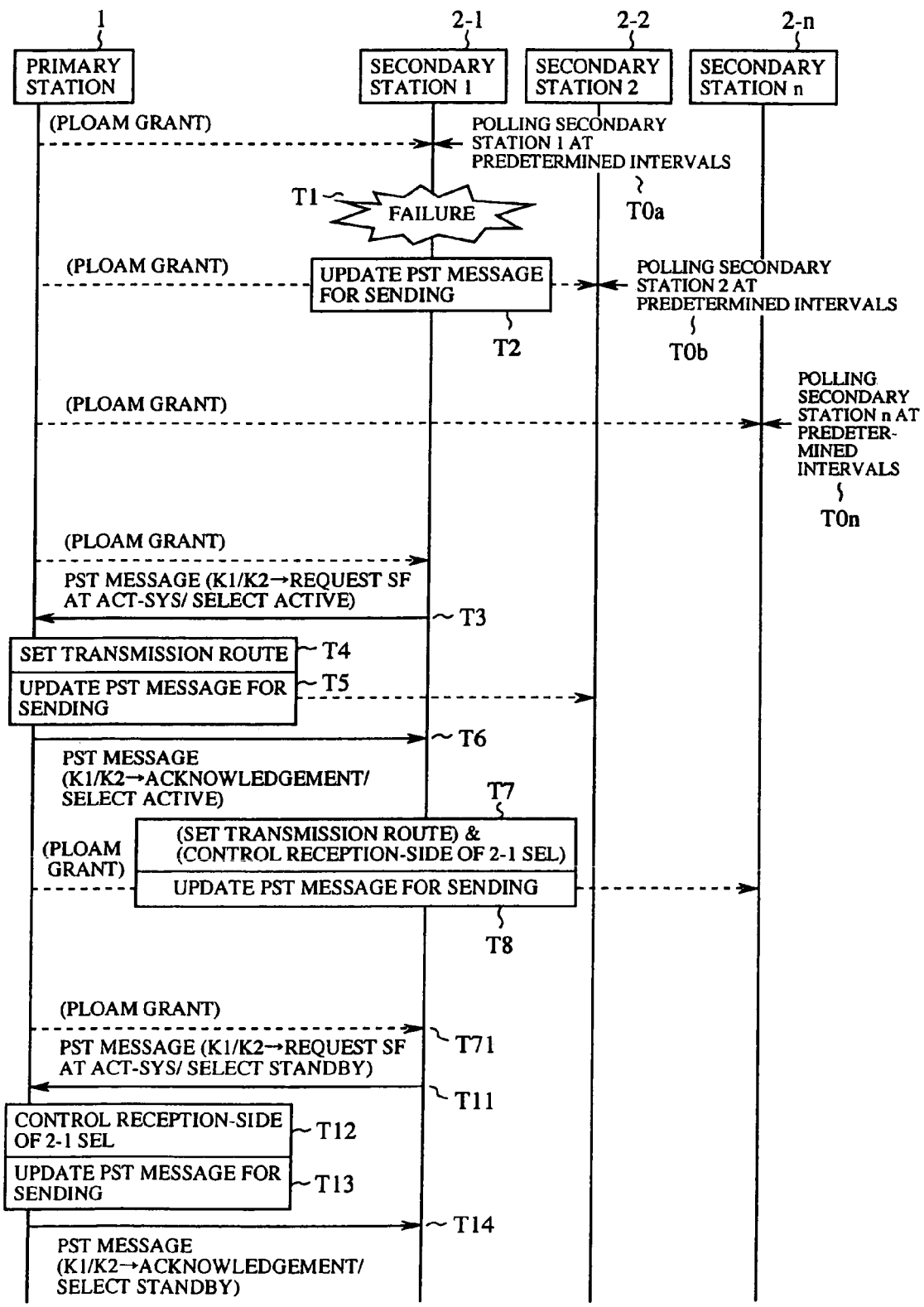
Figure 4A:
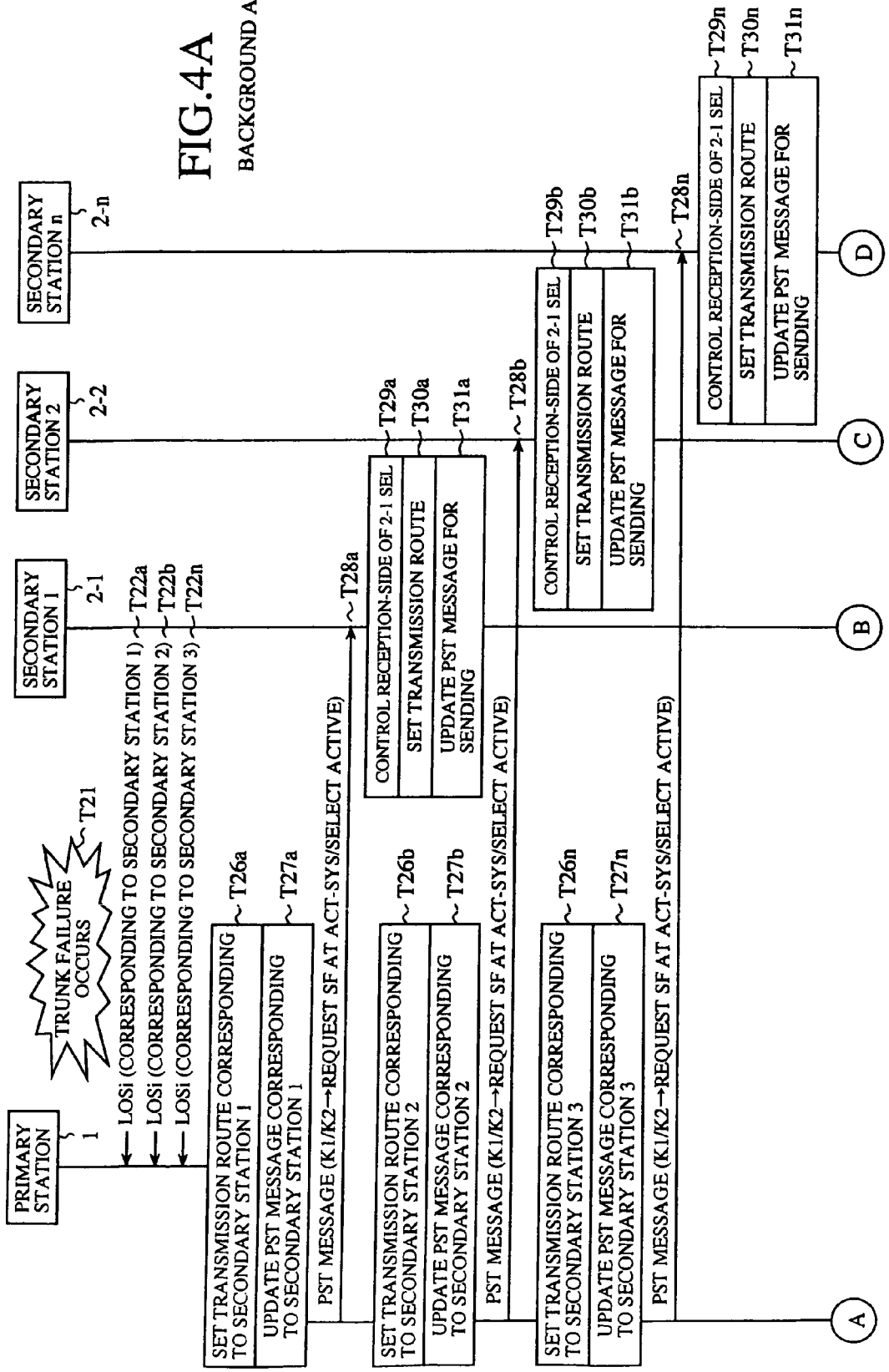
Figure 5A:
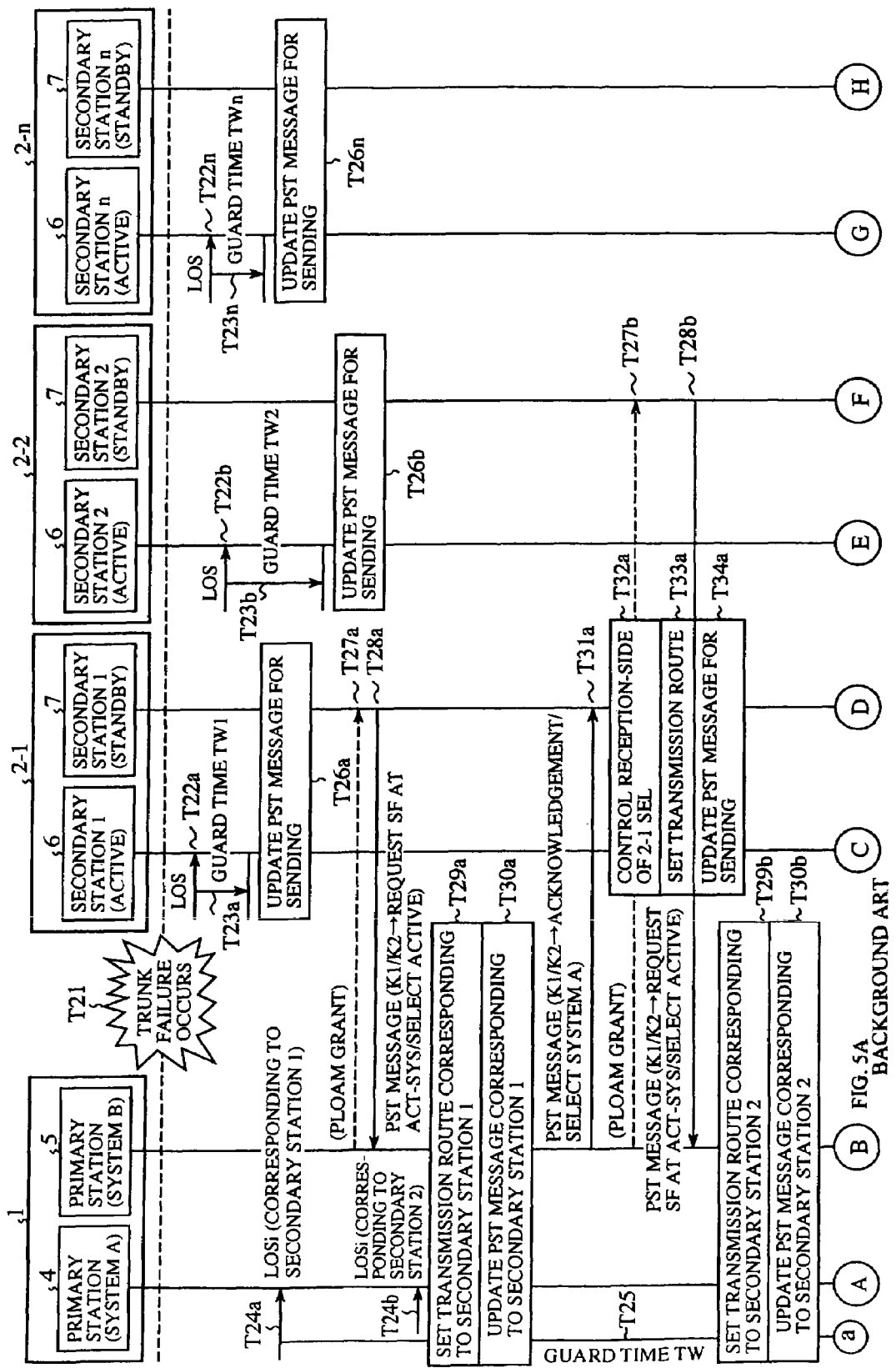
Figure 6:
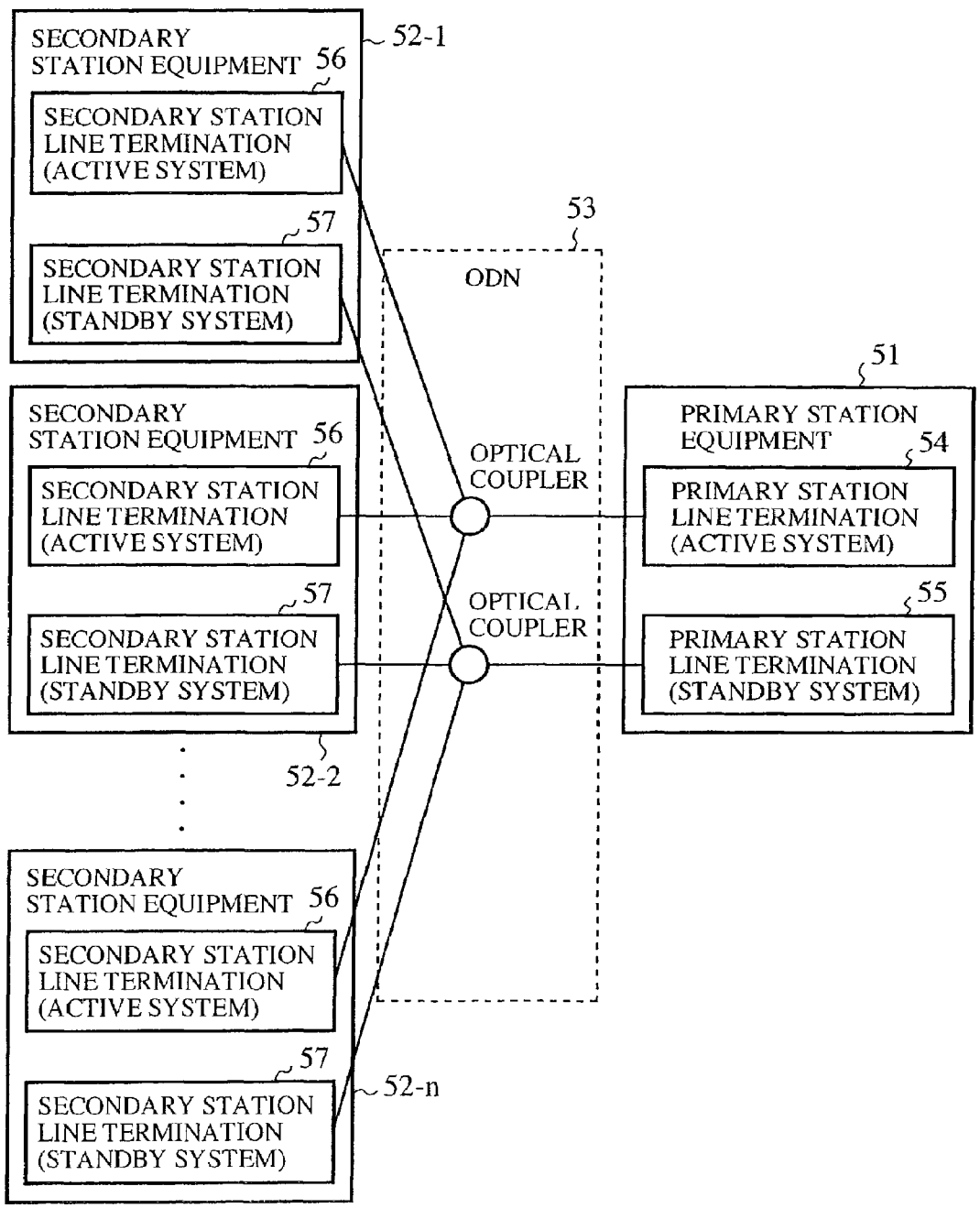
FIG. 6 shows a configuration of a passive optical network communications system according to a first embodiment of the present invention.

FIG. 6 shows a configuration of a passive optical network communications system according to a first embodiment of the present invention. Referring to FIG. 6, the system comprises a primary station equipment unit 51, secondary station equipment units 52-1-52-n, an optical distribution network (ODN) 53 implemented by passive elements such as optical couplers-and optical fibers, a primary station line termination 54 for an active system, a primary station line termination 55 for a standby system, a secondary station line termination 56 for an active system and a secondary station line termination 57 for a standby system.

Figure 7:
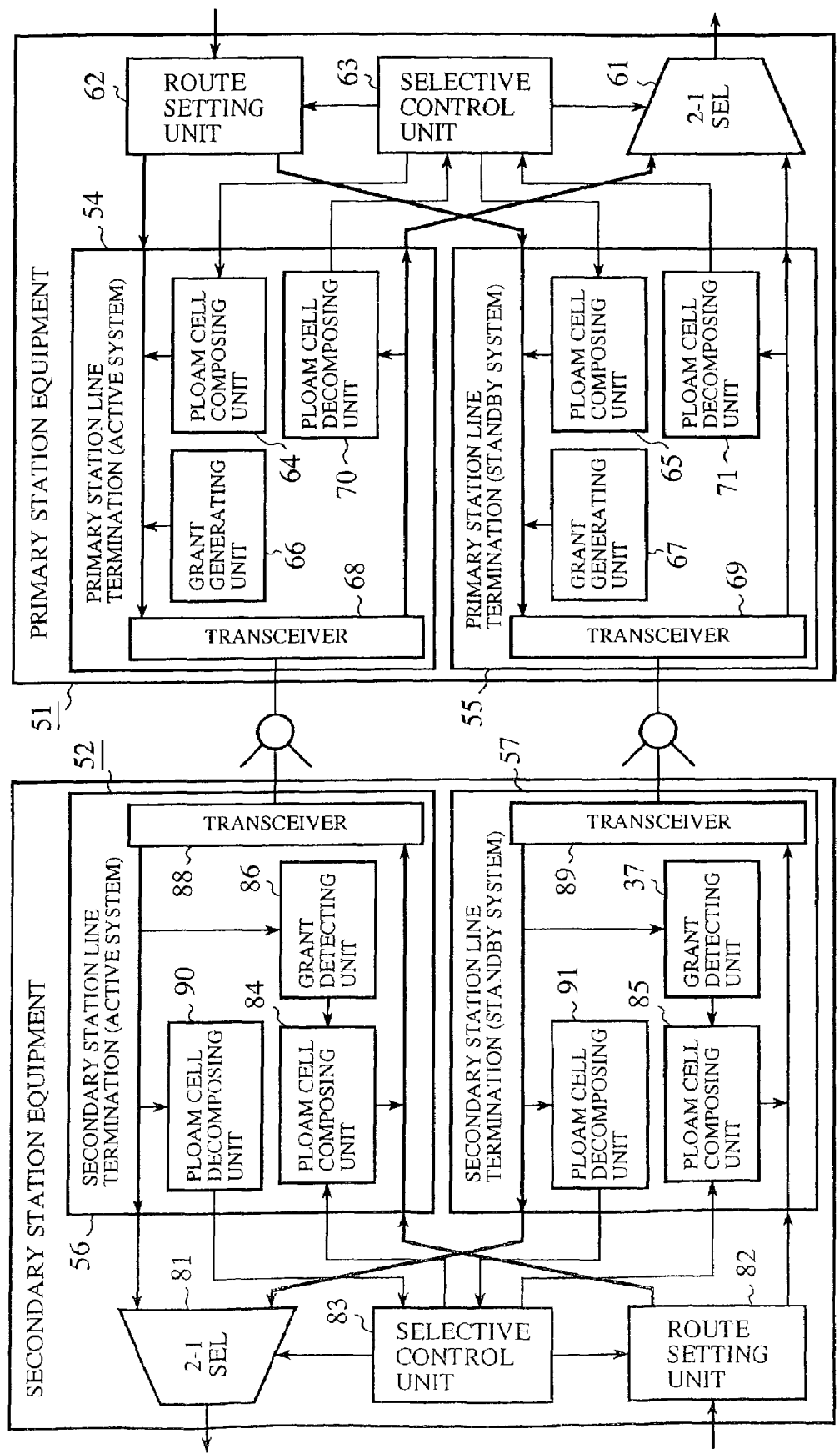
FIG. 7 shows a detailed configuration of the passive optical network communications system according to the first embodiment.

FIG. 7 shows a detailed configuration of the passive optical network communications system according to the first embodiment. Referring to FIG. 7, a secondary station equipment unit 52 is one of secondary station equipment units 52-1-52-n. A 2-1 selector 61 selectively outputs one of a signal received by the primary station line termination 54 for the active system and the primary station line termination 55 for the standby system, under the direction of a selective control unit 63. A route setting unit 62 outputs a main signal to at least one of the primary station line termination 54 for the active system and the primary station line termination 55 for the standby system, under the direction of the selective control unit 63. The selective control unit 63 controls the 2-1 selector 61 and the route setting unit 62, based on K1/K2 bytes included in a PON section trace (PST) message, which is a type of physical layer operations administration and maintenance (PLOAM) message.

PLOAM cell composing units 64 and 65 output the PST message output from the selective control unit 63 to transceivers 68 and 69. Grant generating units 66 and 67 generate PLOAM grants (PLOAM cell transmission enable signals) so as to output the PLOAM grants thus generated to the transceivers 68 and 69. The transceivers 68 and 69 transmit the main signal, the PLOAM cell and the grant to the secondary station equipment unit 52 and also receives the main signal and the PLOAM cell from the secondary station equipment unit 52. PLOAM cell decomposing units 70 and 71 receive the PLOAM cell received by the transceivers 68 and 69 and output the PST message to the selective control unit 63.

A 2-1 selector 81 selects one of a main signal received by a secondary station line termination 56 for an active system and a main signal received by a secondary station line termination 57 for a standby system, under the direction of a selective control unit 83, so as to output the selected signal. A route setting unit 82 outputs the main signal to at least one of the secondary station line termination 56 for the active system and the secondary station line termination 57 for the standby system, under the direction of the selective control unit 83. The selective control unit 83 controls the 2-1 selector 81 and the route setting unit 82, based on the K1/K2 bytes included in the PST message.

PLOAM cell composing units 84 and 85 output the PLOAM cell including the PST message, supplied from the selective control unit 83, to the transceivers 88 and 89, the timing of output being indicated by the PLOAM grant detected by grant detecting units 86 and 87. The grant detecting units 86 and 87 detect PLOAM grants received by the transceivers 88 and 89. The transceivers 88 and 89 transmit the main signal and the PLOAM cell to the primary station equipment unit 51 and also receives the main signal, the PLOAM cell and the grant from the primary station equipment unit 51. PLOAM cell decomposing units 90 and 91 receive the main signal received by the transceivers 88 and 89 so as to output the PST message to the selective control unit 83.

FIG. 8 shows an example of control effected when a failure occurs in the secondary station equipment unit 5-1. Referring to FIG. 8, the operations of the primary station equipment unit 51 and the secondary station equipment units 52-1-52-n performed in the event of a failure are illustrated along a time line extending in a downward direction in the drawing.

A description will now be given of the operation according to the first embodiment.

An exemplary case where a failure occurs in the secondary station equipment unit 52-1 will be described.

It is assumed that, in a state in which a failure does not occur in the secondary station equipment unit 52-1, the 2-1 selector 61 and the route setting unit 62 select the main signal from the secondary station line termination 56 for the active system and that the 2-1 selector 81 and the route setting unit 82 select the main signal from the primary station line termination 54 for the active system. Thus, the main signal is transmitted and received over the active system.

In a state in which a failure does not occur in the secondary station equipment unit 52-1, the selective control unit 83 of the secondary station equipment unit 52-1 outputs a PST message, comprising the K1 byte indicating that "switching is not requested" and the K2 byte indicating that "the active system is being selected", to the PLOAM cell composing units 84 and 85.

The PLOAM cell including the PST message is transmitted to the primary station equipment unit 51 by the transceivers 88 and 89 of the secondary station equipment unit 52-1. The PLOAM cell thus transmitted is received by the transceivers 68 and 69 of the primary station equipment unit 51 where the PLOAM cell decomposing units 70 and 71 output the PST message included in the PLOAM cell to the selective control unit 63.

Upon receipt of the PST message from the PLOAM cell decomposing units 70 and 71, the selective control unit 63 of the primary station equipment unit 51 controls the 2-1 selector 61 and the route setting unit 62, based on the PST message thus received.

Since the K1 byte received indicates that "switching is not requested", the selection asserted in the 2-1 selector 61 and the route setting unit 62 is maintained (selection of system A is maintained).

In a similar configuration as the secondary station equipment unit 52-1, the primary station equipment unit 51 also transmits the PST message, comprising the K1 byte and the K2 byte, to the secondary station equipment unit 52-1. In this example, it is assumed that the primary station equipment unit 51 does not undergo any failure so that the K1 byte indicating that "switching is not requested" continues to be transmitted to the secondary station equipment unit 52-1.

When a failure occurs in the secondary station line termination 56 for the active system in the secondary station equipment unit 52-1 (T1), the selective control unit 83 of the secondary station equipment unit 52-1 updates the PST message so as to include the K1 byte indicating that "switching is being requested due to signal fail (SF)" and the K2 byte indicating that "the active system is being selected". The selective control unit 83 outputs the PST message thus updated to the PLOAM cell composing units 84 and 85 (T2).

The PLOAM cell including the PST message is transmitted to the primary station equipment unit 51 by the transceivers 68 and 69 of the secondary station equipment unit 52-1. The transceiver 69 of the primary station equipment unit 51 receives the PLOAM cell (the PLOAM cell does not arrive at the transceiver 68 since the failure occurred in the active system). The PLOAM cell decomposing unit 71 outputs the PST message included in the PLOAM cell to the selective control unit 63 (T3).

The selective control unit 63 of the primary station equipment unit 51 receiving the PST message from the PLOAM cell decomposing unit 71 controls the route setting unit 62, based on the PST message.

Since the K1 byte received indicates that "switching is being requested due to signal fail (SF)", the selective control unit 63 outputs an instruction directing the route setting unit 62 to be switched to system B (T4).

The primary station equipment unit 51 updates the K1 byte so as to indicate "acknowledgement" (T5) since it has acknowledged that a failure occurred in the secondary station equipment unit 52-1.

The selective control unit 63 of the primary station equipment unit 51 outputs the PST message, comprising the K1 byte indicating "acknowledgement" and the K2 byte indicating that "the active is being selected", to the PLOAM cells composing units 64 and 65.

The PLOAM cell including the PST message is transmitted by the transceivers 68 and 69 of the primary station equipment unit 51 to the secondary station equipment unit 52-1. The PLOAM cell is received by the transceiver 89 of the secondary station equipment unit 52-1 where the PLOAM cell decomposing unit 91 outputs the PST message included in the PLOAM cell to the selective control unit 83 (T6).

Upon receipt of the PST message from the PLOAM cell decomposing unit 91, the selective control unit 83 of the secondary-station equipment unit 52-1 controls the 2-1 selector 81 and the route setting unit 82, based on the PST message.

Since the K1 byte received indicates "acknowledgement", the selective control unit 83 outputs an instruction directing the 2-1 selector 81 and the route setting unit 82 to be switched to the standby system (T7).

The selective control unit 83 of the secondary station equipment unit 52-1 updates the PST message so as to include the K1 byte indicating that "switching is being requested due to signal fail (SF)" and the K2 byte indicating that "the standby system is being selected", so as to output the PST message thus updated to the PLOAM cell composing units 84 and 85 (T8).

After outputting the PST message at T6, the selective control unit 63 of the primary station equipment unit 51 sends the PLOAM grant after a predetermined period of time (Tw) elapses so as to receive the PST message from the secondary station equipment units 52-1 (T9, T10).

The selective control unit 83 of the secondary station equipment unit 52-1 outputs the PST message, comprising the K1 byte indicating that "switching is being requested due to signal fail (SF)" and the K2 byte indicating that "the standby system is being selected", to the PLOAM cell composing units 84 and 85, the output being timed in accordance with the reception of the PLOAM grant at T10.

The PLOAM cell including the PST message is received by the transceiver 69 of the primary station equipment 51 where the PLOAM cell decomposing unit 71 outputs the PST message included in the PLOAM cell to the selective control unit 63 (T11).

The selective control unit 63 of the primary station equipment unit 51 receiving the PST message from the PLOAM cell decomposing unit 71 controls the 2-1 selector 61, based on the PST message.

Since the K2 byte received from the secondary station equipment unit 52-1 indicates that "the standby system is being selected", the selective control unit 63 outputs an instruction directing the 2-1 selector 61 to be switched to the standby system (T12). Subsequently, the main signal is transmitted and received over the standby system.

Finally, the selective control unit 63 of the primary station equipment unit 51 updates the PST message so as to include the K1 byte indicating "acknowledgement" and the K2 byte indicating that "the standby system is being selected". The selective control unit 63 outputs the PST message to the PLOAM cell composing units 64 and 65 (T13).

The PLOAM cell including the PST message is transmitted to the secondary station equipment unit 52-1 by the transceivers 68 and 69 of the primary station equipment unit (T14). The transceiver 89 of the secondary station equipment unit 52-1 receives the PLOAM cell. The PLOAM cell decomposing unit 91 outputs the PST message included in the PLOAM cell to the selective control unit 83, thus completing a redundancy switching sequence.

Referring to T10-T11, there may be other PLOAM cells in the PLOAM cell composing unit 85 of the secondary station equipment unit 52-1 standing by for transmission ahead of the PST message updated as described above. In this case, the PLOAM grant from the primary station equipment unit 51 is used for the transmission of the other PLOAM cells that are waiting. It is that expected that the target PST message is placed in a standby state in which it has to stand by for the transmission. Accordingly, the selective control unit 63 of the primary station equipment unit 51 repeats the transmission of the PLOAM grant at predetermined intervals (Tw) until the target PST message is received from the secondary station equipment unit 52-1 (not shown).

By employing the control described above, the secondary station equipment 52-1 receives the PLOAM grant (PLOAM cell transmission-enable signal) from the primary station equipment unit 51 to enable the transmission of the PST message at T11. Accordingly, queueing time required to stand by for the transmission of the PST message is ensured to be reduced so that the time required for the whole process of redundancy switching is successfully reduced.

The time (T6-T8) required for redundancy switching process in the secondary station 52-1 varies depending on the performance of the secondary station equipment unit 52-1 (i.e. it differs from vendor to vendor). In this regard, the primary station equipment unit 51 learns the time required for the redundancy switching process in the secondary station equipment unit 52 connected thereto in consideration of the multi-vendor connection possibly implemented between the primary station equipment unit 51 and the secondary station equipment unit 52. The timing of transmission of the PLOAM grant is adjusted in accordance with the time thus learned.

More specifically, the primary station equipment unit initially generates the PLOAM grant at predetermined intervals (Tw). When the expected PST message is not returned from the secondary station equipment unit 52-1, the primary station equipment unit waits for the predetermined period time (Tw) again before generating the PLOAM grant. The primary station equipment unit learns the time it takes to receive the expected PST message from the secondary station equipment unit 52-1. Generation of excessive number of PLOAM grants is prevented by generating the PLOAM grant after the learned time elapses in subsequent instances of redundancy switching. Thereby, the time required for the whole process of redundancy switching is reduced.

The primary station equipment unit 51 is operated on the assumption that the secondary station equipment unit 52-1 may be switched to that of a different vendor. For this reason, the time learned as described above is reset at each instance of ranging (1), FSAN number change (2), and secondary station equipment unit registration. In a POPUP procedure (3), the learned time is not reset. As a result of this operation in the primary station equipment unit 51, generation of the PLOAM grants is timed optimally when the secondary station equipment unit is switched to that of a different vendor. Thus, the time required for the whole process of redundancy switching is reduced.

(1) Ranging is defined as measurement in the primary station equipment unit 51 of a distance with respect to the secondary station equipment unit 52 when an optical fiber is connected between the primary station equipment unit 51 and the secondary station equipment unit 52, when the power is turned on in the primary station equipment unit 51 or the secondary station equipment unit 52, or when the primary station equipment unit 51 or the secondary station equipment unit 52 is reset. Upstream data transmitted by the secondary station equipment unit 52 is provided with a delay, based on the result of measurement. With this, collision of data from the secondary station equipment unit 52 over the optical fiber (transmission channel) is avoided.

(2) FSAN number is defined as a unique 8-byte number assigned permanently to the secondary station equipment unit 52, comprising a 4-byte vendor code and a 4-byte serial number. In order to properly connect the secondary station equipment unit 52 to the primary station equipment unit 51, the FSAN number of the secondary station equipment unit 52 to be connected to the primary station equipment unit 51 should be properly set. The act of setting is referred to as registration of the secondary station equipment unit 52.

(3) A POPUP procedure is referred to as a procedure for efficiently resuming, without performing ranging from scratch, PON connection between the primary station equipment unit 51 and the secondary station equipment unit 52, in the event of an instantaneous interruption lasting for several hundred milliseconds in an optical fiber network and caused, for example, by the maintenance of a transmission channel.

As is clear from the above description, redundancy switching in the secondary station equipment unit 52 according to the first embodiment is configured such that, when a predetermined period of time elapses after the primary station equipment unit 51 transmits the PST message to the secondary station equipment unit 52, the PLOAM grant (PLOAM cell transmission enable signal) granting the transmission of the upstream PST message from the secondary station equipment unit 52 is transmitted to the secondary station equipment unit 52. Accordingly, the time required for redundancy switching in the secondary station equipment unit 52 is reduced.

While the PST message is described above as being transmitted to both the non-selected system and the selected system, the same effect is achieved by only transmitting to the non-selected system.

SECOND EMBODIMENT

In the first embodiment, when a predetermined period of time elapses after the primary station equipment unit 51 transmits the PST message to the secondary station equipment unit 52, the PLOAM grant granting the transmission of the upstream PST message from the secondary station equipment unit 52 is transmitted to the secondary station equipment unit 52. Alternatively, the first example of related art, in which primary station equipment unit 51 transmits the PLOAM grant to the secondary station equipment unit 52 independent of the transmission of the downstream PST message to the secondary station equipment unit 52, may be modified such that, instead of transmitting the PLOAM grant at the same intervals in the active system and in the standby system, the interval of transmission from the primary station equipment unit 51 to the secondary station equipment unit for the standby system (the secondary station line termination 57 for the standby system) may be configured to be shorter than that of the transmission to the secondary station equipment unit 52 for the active system (the secondary station line termination 56 for the active system).

More specifically, the system according to the second embodiment is configured as follows.

FIGS. 9A and 9B show an example of control effected when a failure occurs in the secondary station equipment unit 52-1. Referring to FIGS. 9A and 9B, the operations of the primary station equipment unit 51 and the secondary station equipment units 52-1-52-n performed in the event of a failure are illustrated along a time line extending in a downward direction in the drawing. In the second embodiment, the primary station line termination 54 for the active system is referred to as the primary station line termination 54 for system A and the primary station line termination 55 for the standby system is referred to as the primary system signal termination 55 for system B.

A description will now be given of the operation according to the second embodiment.

An exemplary case where a failure occurs in the secondary station equipment unit 52-1 will be described.

It is assumed that, in a state in which a failure does not occur in the secondary station equipment unit 52-1, the 2-1 selector 61 and the route setting unit 62 select the main signal from the secondary station line termination 56 for the active system and that the 2-1 selector 81 and the route setting unit 82 select the main signal from the primary station line termination 54 for system A. Thus, the main signal is transmitted and received over the active system.

In a state in which a failure does not occur in the secondary station equipment unit 52-1, the selective control unit 83 of the secondary station equipment unit 52-1 outputs a PST message, comprising the K1 byte indicating that "switching is not requested" and the K2 byte indicating that "the active system is being selected", to the PLOAM cell composing units 84 and 85.

The PLOAM cell including the PST message is transmitted to the primary station equipment unit 51 by the transceivers 88 and 89 of the secondary station equipment unit 52-1. The PLOAM cell thus transmitted is received by the transceivers 68 and 69 of the primary station equipment unit 51 where the PLOAM cell decomposing units 70 and 71 output the PST message included in the PLOAM cell to the selective control unit 63.

Upon receipt of the PST message from the PLOAM cell decomposing units 70 and 71, the selective control unit 63 of the primary station equipment unit 51 controls the 2-1 selector 61 and the route setting unit 62, based on the PST message thus received.

Since the K1 byte received indicates that "switching is not requested", the selection asserted in the 2-1 selector 61 and the route setting unit 62 is maintained (selection of system A is maintained).

In a similar configuration as the secondary station equipment unit 52-1, the primary station equipment unit 51 also transmits the PST message, comprising the K1 byte and the K2 byte, to the secondary station equipment unit 52-1. In this example, it is assumed that the primary station equipment unit 51 does not undergo any failure so that the K1 byte indicating that "switching is not requested" continues to be transmitted to the secondary station equipment unit 52-1.

When a failure occurs in the secondary station line termination 56 for the active system in the secondary station equipment unit 52-1 (T1), the selective control unit 83 of the secondary station equipment unit 52-1 updates the PST message so as to include the K1 byte indicating that "switching is being requested due to signal fail (SF)" and the K2 byte indicating that "the active system is being selected". The selective control unit 83 outputs the PST message thus updated to the PLOAM cell composing units 84 and 85 (T2).

The primary station equipment unit 51 transmits PLOAM grants (PLOAM cell transmission enable signals) to the secondary station equipment units 52-1-52-$n$ at predetermined intervals so as to receive PLOAM cells from the secondary station equipment units 52-1-52-$n$ (T0$a$1, T0$b$1, T0$a$2, T0$b$2, T0$an$, T0$bn$).

A period of transmission TW2 of PLOAM grants from system B is configured to be shorter than a period of transmission TW1 of PLOAM grants from system A so that the frequency of generation of PLOAM grants in system B is larger (T9, T10).

The selective control unit 83 of the secondary station equipment unit 52-1 outputs the PST message, comprising the K1 byte indicating that "switching is being requested due to signal fail (SF)" and the K2 byte indicating that "the active system is being selected", to the PLOAM cell composing units 84 and 85. Actually, the transmission of the PST message to the primary station equipment unit 51 is deferred until T70 when the PLOAM grant is received.

The PLOAM cell including the PST message is transmitted to the primary station equipment unit 51 by the transceivers 88 and 89 of the secondary station equipment unit 52-1. The transceiver 69 of the primary station equipment unit 51 receives the PLOAM cell (the PLOAM cell does not arrive at the transceiver 68 since the failure occurred in the active system). The PLOAM cell decomposing unit 71 outputs the PST message included in the PLOAM cell to the selective control unit 63 (T3).

The selective control unit 63 of the primary station equipment unit 51 receiving the PST message from the PLOAM cell decomposing unit 71 controls the route setting unit 62, based on the PST message.

Since the K1 byte received from the secondary station equipment unit 52-1 indicates that "switching is being requested due to signal fail (SF)", the selective control unit 63 outputs an instruction directing the route setting unit 62 to be switched to system B (T4).

The primary station equipment unit 51 updates the K1 byte so as to indicate "acknowledgement" (T5) since it has acknowledged that a failure occurred in the secondary station equipment unit 52-1.

The selective control unit 63 of the primary station equipment unit 51 outputs the PST message, comprising the K1 byte indicating "acknowledgement" and the K2 byte indicating that "system A is being selected", to the PLOAM cells composing units 64 and 65.

The PLOAM cell including the PST message is transmitted by the transceivers 68 and 69 of the primary station equipment unit 51 to the secondary station equipment unit 52-1. The transceiver 89 of the secondary station equipment unit 52-1 receives the PLOAM cell. The PLOAM cell decomposing unit 91 outputs the PST message included in the PLOAM cell to the selective control unit 83 (T6).

Upon receipt of the PST message from the PLOAM cell decomposing unit 91, the selective control unit 83 of the secondary station equipment unit 52-1 controls the 2-1 selector 81 and the route setting unit 82, based on the PST message.

Since the K1 byte received indicates "acknowledgement", the selective control unit 83 outputs an instruction directing the 2-1 selector 81 and the route setting unit 82 to be switched to the standby system (T7).

The selective control unit 83 of the secondary station equipment unit 52-1 updates the PST message so as to include the K1 byte indicating that "switching is being requested due to signal fail (SF)" and the K2 byte indicating that "the standby system is being selected", so as to output the PST message thus updated to the PLOAM cell composing units 84 and 85 (T8).

The transmission of the PLOAM cell including the PST message from the transceivers 88 and 89 of the secondary station equipment unit 52-1 to the primary station equipment unit 51 is deferred until T71 when the PLOAM grant is received. The transceiver 69 of the primary station equipment unit 51 receives the PLOAM cell. The PLOAM cell decomposing unit 71 outputs the PST message included in the PLOAM cell to the selective control unit 63 (T11).

The selective control unit 63 of the primary station equipment unit 51 receiving the PST message from the PLOAM cell decomposing unit 71 controls the 2-1 selector 61, based on the PST message.

Since the K2 byte received from the secondary station equipment unit 52-1 indicates that "the standby system is being selected", the selective control unit 63 outputs an instruction directing the 2-1 selector 61 to be switched to system B (T12). Subsequently, the main signal is transmitted and received over the standby system and system B.

Finally, the selective control unit 63 of the primary station equipment unit 51 updates the PST message so as to include the K1 byte indicating acknowledgement and the K2 byte indicating that "system B is being selected". The selective control unit 63 outputs the PST message to the PLOAM cell composing units 64 and 65 (T13).

The PLOAM cell including the PST message is transmitted to the secondary station equipment unit 52-1 by the transceivers 68 and 69 of the primary station equipment unit (T14). The transceiver 89 of the secondary station equipment unit 52-1 receives the PLOAM cell. The PLOAM-cell decomposing unit 91 outputs the PST message included in the PLOAM cell to the selective control unit 83, thus completing a redundancy switching sequence.

When the redundancy switching sequence is completed, the main signal is transmitted and received over the standby system and system B, a PLOAM transmission period (TW2) for transmission of PLOAM grants from the primary station line termination 55 for system B to the secondary station line termination 57 for the standby system is changed to a PLOAM transmission period (TW1) used in system A so that the transmission of the main signal is not interfered with (T15).

According to the redundancy switching in the secondary station equipment unit 52-1 of the second embodiment, the period of transmission of PLOAM grants from system B is configured to be shorter than that of system B. As a result, undesired transmission queuing time in which the secondary station equipment unit has to stand by for the reception of the PLOAM grant after the secondary station equipment unit 52-1 updated the PST message is reduced. Therefore, the time required for the whole process of redundancy switching is reduced.

Reducing the period of transmission of PLOAM grants in system A transmitting the main signal results in the transmission of the main signal being interfered with. Accordingly, by only increasing the frequency of generation of PLOAM grants in system B not transmitting the main signal, the period of reception of the PST messages is successfully reduced without affecting system A responsible for the transmission of the main signal.

THIRD EMBODIMENT

FIGS. 10A and 10B show an example of control effected when a failure is detected in the ODN 53 coupled to the primary station equipment unit 51. Referring to FIGS. 10A and 10B, the operations of the primary station equipment unit 51 and the secondary station equipment units 52-1-52-n performed in the event of a failure are illustrated along a time line extending in a downward direction in the drawing.

A description will now be given of the operation according to the third embodiment.

An exemplary case where a failure (hereinafter, referred to as a trunk failure) occurs between an optical coupler and the primary station line termination 54 for the active system.

It is assumed that, in a state in which a trunk failure does not occur, the 2-1 selector 61 and the route setting unit 62 select the main signal from the secondary station line termination 56 for the active system and the 2-1 selector 81 and the route setting unit 82 select the main signal from the primary station line termination 54 for the active system. Thus, the main signal is transmitted and received over the active system.

When a trunk failure occurs (T21), the primary station line termination 54 for the active system in the primary station equipment unit 51 detects a failure (for example, LOSi: loss of signal) corresponding to the secondary station equipment unit 52-1 (T22a). The selective control unit 63 of the primary station equipment unit 51 operates on the assumption that failures corresponding to the other secondary station equipment units 52-2-52-n may simultaneously occur. The count of a queuing timer is started to wait for a predetermined period of time (T23) until the failures corresponding to the other secondary stations (T24a) are detected.

Subsequently, when a failure (for example, LOSi) corresponding to any of the secondary station equipment units 52-2-52-n is detected (T22b, T22n), the selective control unit 63 of the primary station equipment unit 51 waits until the failures corresponding to the entirety of secondary station equipment units are detected (T24b, T24n).

When the failures corresponding to the entirety of secondary station equipment units 52-1-52-n connected to (registered in) the primary station line termination 54 for the active system of the primary station equipment unit 51 are detected, the selective control unit 63 of the primary station equipment unit 51 stops the queuing timer (T25) so as to start a redundancy switching operation.

The selective control unit 63 of the primary station equipment unit 51 detecting the trunk failure in the active system outputs an instruction directing the route setting unit 62 to be switched to the standby system (T26a, T26b, T26n).

Since the selective control unit 63 of the primary station equipment unit 51 detected the failures corresponding to the secondary station equipment units 52-1, 52-2, 52-n, it updates the PST message so as to include the K1 byte indicating that "switching is being requested due to signal fail (SF)" and the K2 byte indicating that "the active system is being selected" (T27a, T27b, T27n).

The selective control unit 63 of the primary station equipment unit 51 outputs the PST message, comprising the K1 byte indicating that "switching is being requested due to signal fail (SF)" and the K2 byte indicating that "the active system is being selected", to the PLOAM cell composing units 64 and 65.

The PLOAM cell including the PST message is transmitted to the secondary station equipment units 52-1, 52-2, 52-n by the transceivers 68 and 69 of the primary station equipment unit 51. The transceiver 89 of the secondary station equipment units 52-1, 52-2, 52-n receives the PLOAM cell (the PLOAM cell does not arrive at the transceiver 88 since the failure occurred in the active system). The PLOAM cell decomposing unit 91 outputs the PST message included in the PLOAM cell to the selective control unit 83 (T28a, T28b, T28n).

The selective control unit 83 of the secondary station equipment units 52-1, 52-2, 52-n receiving the PST message from the PLOAM cell decomposing unit 91 controls the 2-1 selector 81 and the route setting unit 82, based on the PST message.

Since the K1 byte received indicates that "switching is being requested due to signal fail (SF)", the selective control unit 83 outputs an instruction directing the 2-1 selector 81 and the route setting unit 82 to be switched to the standby system (T29*a*-T30*a*, T29*b*-T30*b*, T29*n*-T30*n*).

Since the selective control unit 83 of the secondary station equipment units 52-1, 52-2, 52-*n* has acknowledged the detection of a failure by the primary station equipment unit 51, the selective control unit 83 updates the PST message so as to include the K1 byte indicating "acknowledgement" and the K2 byte indicating that "the standby system is being selected". The selective control unit 83 outputs the PST thus updated to the PLOAM cell composing units 84 and 85 (T31*a*, T31*b*, T31*n*).

After outputting the PST message at T28*a*, T28*b*, T28*n*, the selective control unit 63 of the primary station equipment unit 51 sends PLOAM grants after a predetermined period of time (Tw) elapses so as to receive the PST message from the secondary station equipment units 52-1, 52-2, 52-*n* (T32*a*-T33*a*, T32*b*-T33*b*, T32*n*-T33*n*).

At T33*a*, T33*b*, T33*n* when the PLOAM grants are received, the selective control unit 83 of the secondary station equipment units 52-1, 52-2, 52-*n* outputs the PST message including the K1 byte indicating "acknowledgement" and the K2 byte indicating that "the standby system is being selected" to the PLOAM cell composing units 84 and 85 (T34*a*, T34*b*, T34*n*).

The PLOAM cell including the above PST message is received by the transceiver 69 of the primary station equipment unit 51, where the PLOAM cell decomposing unit 71 outputs the PST message included in the PLOAM cell to the selective control unit 63 (T34*a*, T34*b*, T34*n*).

The selective control unit 63 of the primary station equipment unit 51 receiving the PST message from the PLOAM cell decomposing unit 71 controls the 2-1 selector 61, based on the PST message.

Since the K2 byte received indicates that "the standby system is being selected", the selective control unit 63 outputs an instruction directing the 2-1 selector 61 to be switched to the standby system (T35*a*, T35*b*, T35*n*). Subsequently, the main signal is transmitted and received over the standby system.

Finally, the selective control unit 63 of the primary station equipment unit 51 updates the PST message so as to include the K1 byte indicating "switching is being requested due to signal fail (SF)" and the K2 byte indicating that "the standby system is being selected". The selective control unit 63 outputs the PST message to the PLOAM cell composing units 64 and 65 (T36*a*, T36*b*, T36*n*).

The PLOAM cell including the PST message is transmitted to the secondary station equipment units 52-1, 52-2, 52-*n* by the transceivers 68 and 69 of the primary station equipment unit 51. The transceiver 89 of the secondary station equipment units 52-1, 52-2, 52-*n* receives the PLOAM cell. The PLOAM cell decomposing unit 91 outputs the PST message included in the PLOAM cell to the selective control unit 83, thus completing a redundancy switching sequence (not shown).

By employing the control described above, the primary station equipment unit 51 is prevented from performing redundancy switching whenever a failure is detected at T24*a*-T24. Instead, the primary station equipment unit 51 is configured to wait for the detection of the failures of the other secondary station equipment units 52-2-52-*n* so that the redundancy switching process is started only when the failures corresponding to the entirety of the registered secondary station equipment units 52-2-52-*n* are detected or when the predetermined period of time (TW) elapses. Accordingly, the time required for the whole process of redundancy switching is reduced.

Starting the redundancy switching process whenever a failure corresponding to any of the secondary station equipment units 52-2-52-*n* is detected requires that steps for the preparation of the redundancy switching process (for example, starting of redundancy switching process software and updating of a table) be executed each time. This will result in the time required for the whole process of redundancy switching being extended. According to the third embodiment, however, the preparation of the redundancy switching process is started only when the failures corresponding to the entirety of the secondary station are detected. Thus, the time required for the whole process of redundancy switching is reduced.

Since the primary station equipment unit 51 is configured to perform a single series (T26*a*-T26*n*) of steps for redundancy switching for the entirety of secondary station equipment units including the equipment units 52-2-52-*n*, the time required for the whole process of redundancy switching is further reduced.

While the PST message is described above as being transmitted to both the non-selected system and the selected system, the same effect is achieved by only transmitting to the non-selected system.

FOURTH EMBODIMENT

Figure 11B:
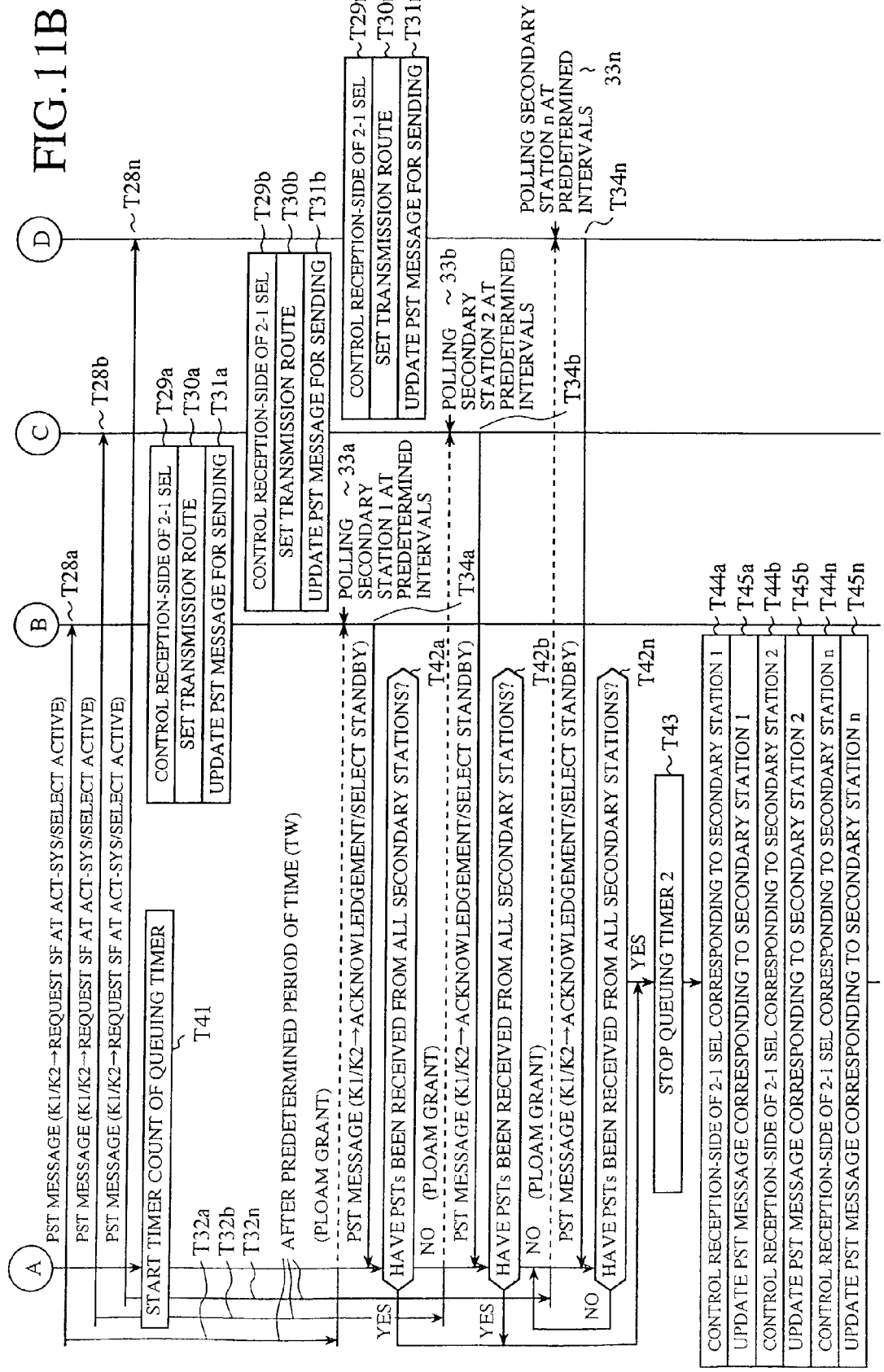

FIGS. 11A and 11B show an example of control effected when a failure is detected in the ODN 53 coupled to the primary station equipment unit 51. Referring to FIGS. 11A and 11B, the operations of the primary station equipment unit 51 and the secondary station equipment units 52-1-52-*n* performed in the event of a failure are illustrated along a time line extending in a downward direction in the drawing.

A description will now be given of the operation according to the fourth embodiment.

An exemplary case where a failure (hereinafter, referred to as a trunk failure) occurs between an optical coupler and the primary station line termination 54 for the active system.

It is assumed that, in a state in which a trunk failure does not occur, the 2-1 selector 61 and the route setting unit 62 select the main signal from the secondary station line termination 56 for the active system and the 2-1 selector 81 and the route setting unit 82 select the main signal from the primary station line termination 54 for the active system. Thus, the main signal is transmitted and received over the active system.

When a trunk failure occurs (T21), the primary station line termination 54 for the active system in the primary station equipment unit 51 waits for the detection of the failures corresponding to the entirety of the secondary station equipment units 52-1-52-*n* (T22*a*-T27*n*), in a similar configuration as the third embodiment.

The selective control unit 63 of the primary station equipment unit 51 outputs the PST message, comprising the K1 byte indicating that "switching is being requested due to signal fail (SF)" and the K2 byte indicating that "the active system is being selected", to the PLOAM cell composing units 64 and 65 in a similar configuration as the third embodiment.

The PLOAM cell including the PST message is transmitted to the secondary station equipment units 52-1, 52-2, 52-*n* by the transceivers 68 and 69 of the primary station equipment unit 51. The transceiver 89 of the secondary station equipment units 52-1, 52-2, 52-*n* receives the PLOAM cell (the PLOAM cell does not arrive at the transceiver 88 since the failure occurred in the active system). The PLOAM cell decomposing unit 91 outputs the PST message included in the PLOAM cell to the selective control unit 83 (T28*a*, T28*b*, T28*n*).

The selective control unit 63 of the primary station equipment unit 51 starts the count of a queuing timer (T41) so as to wait for a predetermined period of time before receiving the PST messages from the entirety of the secondary station equipment units 52-1-52-*n* connected to the primary station line termination 54 for the active system of the primary station equipment unit 51. The selective control unit 63 waits for the PST messages to arrive from the entirety of the secondary station equipment units 52-1-52-*n*.

The selective control unit 83 of the secondary station equipment units 52-1, 52-2, 52-*n* receiving the PST message from the PLOAM cell decomposing unit 91 controls the 2-1 selector 81 and the route setting unit 82, based on the PST message. The PST message for transmission is then updated and transmitted to the primary station equipment unit 51 (T29*a*-T34*n*).

The selective control unit 63 of the primary station equipment unit 51 receiving the PST message from the PLOAM cell decomposing unit 71 (T34*a*) waits for the PST messages to arrive from the other, secondary station equipment units 52-2-52-*n* (T42*a*).

Subsequently, when the PST messages are received from the secondary station equipment units 52-2, 52-*n* (T34*a*, T34*n*), the selective control unit 63 of the primary station equipment unit 51 stands by for the detection of the failures corresponding to the entirety of the secondary station equipment units (T42*b*, T42*n*).

When the PST messages are received from the entirety of the secondary station equipment units 52-1-52-*n* connected to the primary station line termination 54 for the active system of the primary station equipment unit 51, the selective control unit 63 of the primary station equipment unit 51 stops the queuing timer (T43) so as to start a single series of steps of the redundancy switching process.

Since the K2 byte received from the secondary station equipment units 52-2-52-*n* indicates that "the standby system is being selected", the selective control unit 63 outputs an instruction directing the 2-1 selector 61 to be switched to the standby system (T44*a*, T44*b*, T44*n*). Subsequently, the main signal is transmitted and received over the standby system.

Finally, in a similar configuration as the third embodiment, the selective control unit 63 of the primary station equipment unit 51 updates the PST message in a single series of steps so that the PST message includes the K1 byte indicating that "switching is being requested due to signal fail (SF)" and the K2 byte indicating that "the standby system is being selected". The selective control unit 63 outputs the PST messages thus updated to the PLOAM cell composing units 64 and 65 (T45*a*, T45*b*, T45*n*).

The PLOAM cell including the PST message is transmitted to the secondary station equipment units 52-1, 52-2, 52-*n* by the transceivers 68 and 69 of the primary station equipment unit 51. The PLOAM cell is received by the transceiver 89 of the secondary station equipment units 52-1, 52-2, 52-*n* where the PLOAM cell decomposing units 90 and 91 outputs the PST message included in the PLOAM cell to the selective control unit 83, thus completing a redundancy switching sequence (not shown).

By employing the control described above, the primary station equipment unit 51 is prevented from continuing the redundancy switching process at each reception of the PST message at T42*a*, T42*b*, T42*n*. Instead, the redundancy switching process is continued in a single series of steps after the PST messages are received from the entirety of the secondary station equipment units 52-1-52-*n*. Accordingly, the time required for the whole process of redundancy switching is reduced as compared to that of the second embodiment.

While the PST message is described above as being transmitted to both the non-selected system and the selected system, the same effect is achieved by only transmitting to the non-selected system.

FIFTH EMBODIMENT

Figure 12A:
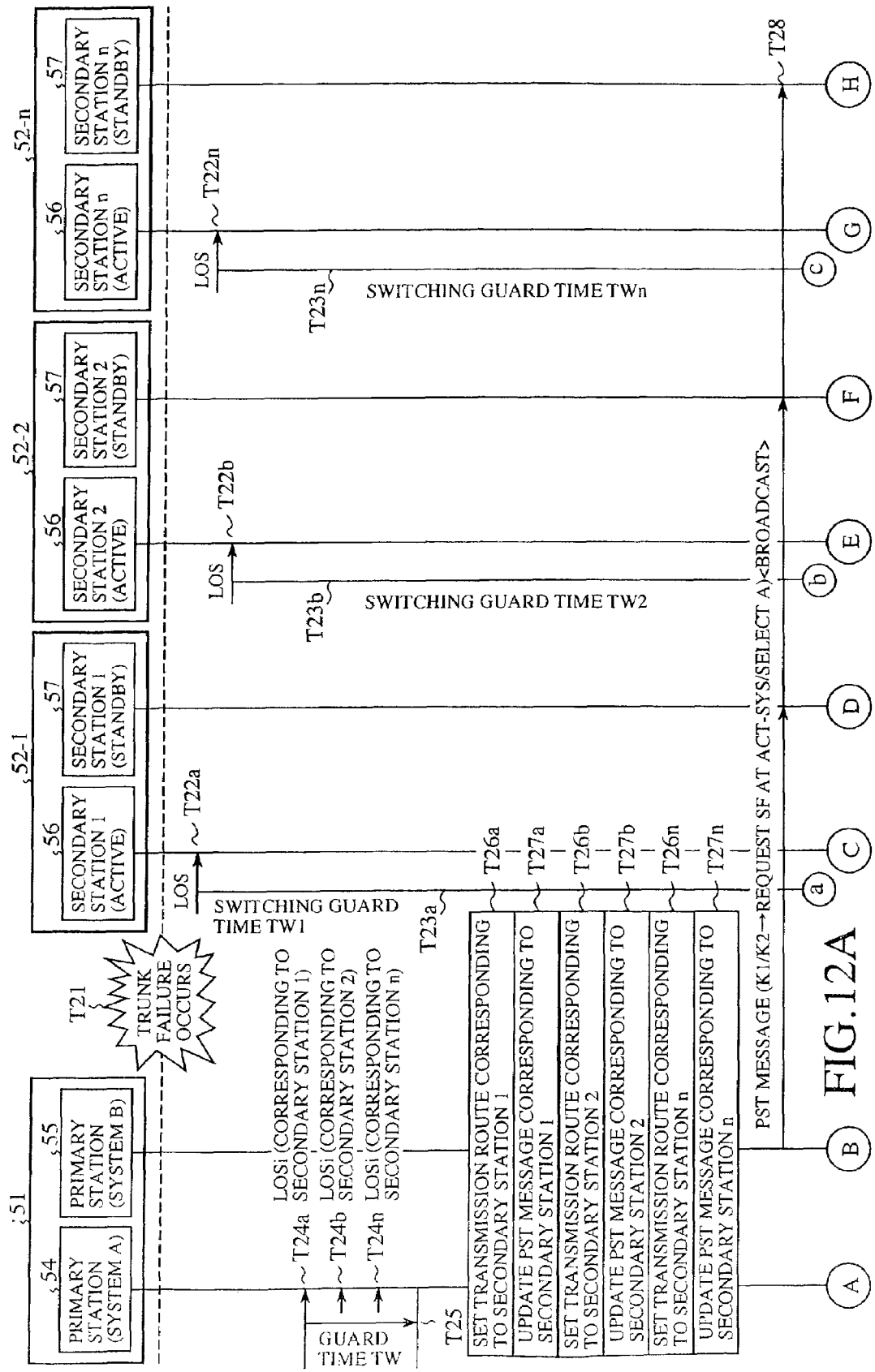
Figure 12B:
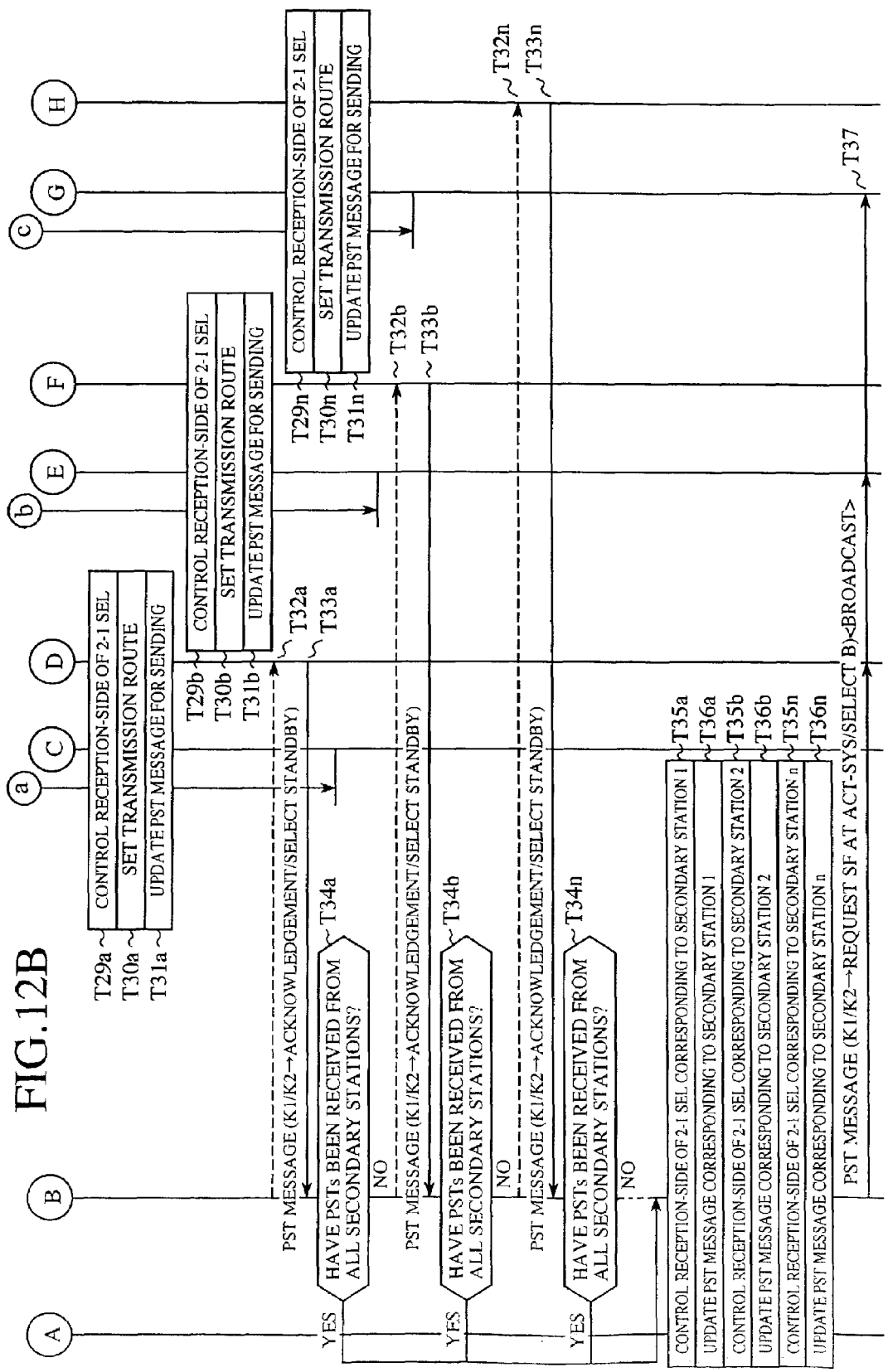

FIGS. 12A and 12B show an example of control effected when a failure is detected in the ODN 3 coupled to the primary station equipment unit 51. Referring to FIGS. 12A and 12B, the operations of the primary station equipment unit 51 and the secondary station equipment units 52-1-52-*n* performed in the event of a failure are illustrated along a time line extending in a downward direction in the drawing. In the fifth embodiment, the primary station line termination 54 for the active system is referred to as the primary station line termination 54 for system A and the primary-station line termination 55 for the standby system is referred to as the primary station line termination 55 for system B.

A description will now been given of the operation according to the fifth embodiment.

An exemplary case where a failure (hereinafter, referred to as a trunk failure) occurs between an optical coupler and the primary station line termination 54 for the active system.

It is assumed that, in a state in which a trunk failure does not occur, the 2-1 selector 61 and the route setting unit 62 select the main signal from the secondary station line termination 56 for the active system and the 2-1 selector 81 and the route setting unit 82 select the main signal from the primary station line termination 54 for system A. Thus, the main signal is transmitted and received over the active system.

When a trunk failure occurs (T21), the secondary station line termination 56 for the active system in the secondary station equipment units 52-1-52-*n* detects the failure (for example, LOS: loss of signal) (T22*a*, T22*b*, T22*n*). The primary station line termination 54 for system A in the primary station equipment unit 51 also detects a failure (for example LOSi: loss of signal) corresponding to the secondary station equipment units 52-1-52-*n* (T24*a*, T24*b*, T24*n*).

The redundancy switching sequence is executed when a switching guard time (TW1, TW2, TW*n*) elapses after the failure is detected. The switching guard time TW of the primary station equipment unit 51 is configured to be shorter than the switching guard time TW1, TW2 and TW*n* of the secondary station equipment units so that the primary station equipment unit 51 initiates the redundancy switching operation (T25, T23*a*, T23*b*, T23*n*).

Since the selective control unit 63 of the primary station equipment unit 51 detected the trunk failure in system A, it outputs an instruction directing the route setting unit 62 to be switched to system B (T26*a*, T26*b*, T26*n*).

Since the, selective control unit 63 of the primary station equipment unit 51 detected the failure corresponding to the secondary station equipment units 52-2-52-*n*, it updates the PST message so as to include the K1 byte indicating that "switching is being requested due to signal fail (SF)" and the K2 byte indicating that "system A is being selected" (T27*a*, T27*b*, T27*n*).

The selective control unit 63 of the primary station equipment unit 51 outputs the PST message, comprising the K1 byte indicating that "switching is being requested due to signal fail (SF)" and the K2 byte indicating that "system A is being selected", to the PLOAM cell composing units 64 and 65.

The PLOAM cell including the PST message is broadcast by the transceivers 68 and 69 of the primary station equipment unit 51 to the secondary station equipment units 52-2-52-*n*. The PLOAM cell is received by the transceiver 89 of the secondary station equipment units 52-2-52-*n* (the PLOAM cell does not arrive at the transceiver 88 since system A is in failure), where the PLOAM cell decomposing unit 91 outputs the PST message included in the PLOAM cell to the selective control unit 83 (T28).

The selective control unit 83 of the secondary station equipment units 52-2-52-n receiving the PST message from the PLOAM cell decomposing unit 91 controls the 2-1 selector 81 and the route setting unit 82, based on the PST message.

Since the K1 byte received indicates that "switching is being requested due to signal fail (SF)", the selective control unit 83 outputs an instruction directing the 2-1 selector 81 and the route setting unit 82 to be switched to the standby system (T29a, T30a, T29b, T30b, T29n, T30n).

Since the selective control unit 83 of the, secondary station equipment units 52-2-52-n acknowledged the detection of the failure by the primary station equipment unit 51, the selective control unit 83 updates the PST message so as to include the K1 byte indicating "acknowledgement" and the K2 byte indicating that "the standby system is being selected" and outputs the resultant PST message to the PLOAM cell composing units 84 and 85 (T31a, T31b, T31n).

The primary station equipment unit 51 transmits PLOAM grants (PLOAM cell transmission enable signals) to the secondary station equipment units 52-1-52-n at predetermined intervals so as to receive PLOAM cells from the secondary station equipment units 52-1-52-n (T32a, T32b, T32n).

The selective control unit 83 of the secondary station equipment unit 52-1 outputs the PST message, comprising the K1 byte indicating that "switching is being requested due to signal fail (SF)" and the K2 byte indicating that "acknowledgement", to the PLOAM cell composing units 84 and 85. Actually, the transmission of the PST message to the primary station equipment unit 51 is deferred until T70 when the PLOAM grant is received at T32a, T32b, T32n.

The transceiver 69 of the primary station equipment unit 51 receives the PLOAM cell. The PLOAM cell decomposing unit 71 outputs the PST message included in the PLOAM cell to the selective control unit 63 (T33a, T33b, T33n).

The selective control unit 63 of the primary station 51 receiving the PST message from the PLOAM cell decomposing unit 71 waits for the PST messages from the other secondary station equipment units 52-2-52-n (T34a). The PST messages from the other secondary station equipment units 52-2-52-n continue to be received (T34b, T34n). When the selective control unit 63 of the primary station equipment unit 51 receives the PST messages from the entirety of the secondary station equipment units, it resumes the process of redundancy switching in a single series of steps.

Since the K2 byte received from the secondary station equipment units 52-2-52-n indicates that "the standby system is being selected", the selective control unit 63 outputs an instruction directing the 2-1 selector 61 to be switched to system B (T35a, T35b, T35n). Subsequently, the main signal is transmitted and received over the standby system and system B.

Finally, the selective control unit 63 of the primary station equipment unit 51 updates the PST messages so as to include the K1 byte indicating that "switching is being requested due to signal fail (SF)" and the K2 byte indicating that "system B is being selected" in a single series of steps. The selective control unit 63 outputs the resultant PST messages to the PLOAM cell composing units 64 and 65 for system A and system B, respectively (T36a, T36b, T36n).

The PLOAM cell including the PST message is broadcast to the secondary station equipment units 52-2-52-n by the transceivers 68 and 69 of the primary station equipment unit 51 (T37). The PLOAM cell is received by the transceiver 89 of the secondary station equipment units 52-1-52-n where the PLOAM cell decomposing unit 91 outputs the PST message included in the PLOAM cell to the selective control unit 83, thus completing a sequence of redundancy switching.

By employing the control described above, the primary station equipment unit 51 is given an initiative in starting the redundancy switching process. Each of the secondary station equipment units 52-2-52-n only has to wait once for the PLOAM grant for transmission of the PST message to request the redundancy switching process in the primary station equipment unit 51.

By enabling the primary station equipment unit 51 to broadcast the PST messages to the secondary station equipment units 52-1-52-n, the time required for the whole process of redundancy switching is reduced. Starting the redundancy switching process whenever a failure corresponding to any of the secondary station equipment units 52-2-52-n is detected requires that steps for the preparation of the redundancy switching process (for example, starting of redundancy switching process software and updating of a table) be executed each time. This will result in the time required for the whole process of redundancy switching being extended. According to the fifth embodiment, however, the preparation of the redundancy switching process in the primary station equipment unit 51 is performed in a single series of steps (T26a-T26n, T27a-T27n) for the entirety of the secondary station equipment units. As a result, the time required for the whole process of redundancy switching is reduced.

INDUSTRIAL APPLICABILITY

As described above, the passive optical network communications system according to the present invention is adapted for requirements for reduction in the processing time for switching the primary station equipment for the active system or the secondary station equipment for the active system to that of the standby system, when a failure occurs in the primary station equipment for the active system or the secondary station equipment for the active system.

The invention claimed is:

1. A passive optical network communications system comprising:
    a primary station equipment unit connected to a plurality of secondary station equipment units via first and second optical networks,
    wherein said primary station equipment unit is configured to detect a failure occurring in a trunk portion of the first or second optical network corresponding to one of said plurality of secondary station equipment units, and be given an initiative in starting a redundancy switching process after a guard time to determine whether or not the failure occurs for all the secondary station equipment units considering a PON topology, and
    said primary station equipment unit is configured to detect a failure corresponding to more than one of the plurality of secondary station equipment units during the guard time.

2. The system of claim 1, wherein the primary station equipment unit is configured to initiate redundancy switching for all of the plurality of secondary station equipment units by broadcasting a message to all of the plurality of secondary station equipment units simultaneously.

3. The system according to claim 1, wherein said guard time is shorter than a guard time of at least one of said plurality of secondary station equipment units.

* * * * *